(12) United States Patent
Strong

(10) Patent No.: US 7,296,960 B2
(45) Date of Patent: *Nov. 20, 2007

(54) COUPLING SYSTEM FOR ATTACHMENT OF A SEAT TO ALLOW SECURING AND/OR LIFTING THEREOF

(75) Inventor: Russell W. Strong, Craftsbury Common, VT (US)

(73) Assignee: Integrated Vision, Inc., Craftsbury Common, VT (US)

( * ) Notice: Subject to any disclaimer, the term of this patent is extended or adjusted under 35 U.S.C. 154(b) by 695 days.

This patent is subject to a terminal disclaimer.

(21) Appl. No.: 10/154,077

(22) Filed: May 23, 2002

(65) Prior Publication Data
US 2005/0189798 A1   Sep. 1, 2005

Related U.S. Application Data

(60) Provisional application No. 60/318,911, filed on Sep. 13, 2001, provisional application No. 60/317,008, filed on Sep. 4, 2001, provisional application No. 60/293,663, filed on May 25, 2001, provisional application No. 60/293,673, filed on May 25, 2001, provisional application No. 60/293,849, filed on May 25, 2001.

(51) Int. Cl.
*A61G 3/02* (2006.01)

(52) U.S. Cl. ........................ 414/546; 414/921
(58) Field of Classification Search ............. 414/539, 414/546, 541, 921, 522; 180/333, 65.1, 9.1
See application file for complete search history.

(56) References Cited

U.S. PATENT DOCUMENTS

| 3,910,432 | A | | 10/1975 | Browne et al. |
| 4,075,719 | A | | 2/1978 | Sullivan |
| 4,096,955 | A | | 6/1978 | Dake |
| 4,170,368 | A | * | 10/1979 | Southward et al. ...... 280/250.1 |
| 4,483,653 | A | | 11/1984 | Waite |
| 5,333,333 | A | * | 8/1994 | Mah ............................ 5/87.1 |
| 5,388,289 | A | | 2/1995 | Casperson |
| 5,466,111 | A | | 11/1995 | Meyer |
| 5,540,539 | A | | 7/1996 | Wolfman et al. |
| 6,203,044 | B1 | | 3/2001 | Conaway et al. |
| 6,325,168 | B1 | * | 12/2001 | Hillel ........................ 180/14.1 |
| 6,416,272 | B1 | | 7/2002 | Suehiro et al. |
| 6,419,036 | B1 | * | 7/2002 | Miglia ....................... 180/9.1 |

(Continued)

FOREIGN PATENT DOCUMENTS

FR       2 699 129 A1     12/1992

*Primary Examiner*—Charles A Fox
(74) *Attorney, Agent, or Firm*—John S. Artz; Dickstein Wright PLLC

(57) ABSTRACT

A coupling device for a chair device, such as a wheelchair includes a bracket that is intended to be integrally incorporated in the chair device frame or secured to the frame of the wheelchair. The bracket has an attachment system formed by various elements thereof, which is intended for mating with a corresponding engagement device associated with a lift mechanism or a securing position. The attachment system is intended to mate with the corresponding engagement device to allow the wheelchair to be secured in position and then lifted to or lowered from an elevated position within a transportation vehicle or architectural setting while the wheelchair is occupied. The attachment system is additionally intended to universally mate to a corresponding engagement device for securing of a wheelchair in position.

16 Claims, 16 Drawing Sheets

U.S. PATENT DOCUMENTS 6,543,848 B1 4/2003 Suga et al.
6,821,078 B2 * 11/2004 Dudai et al. ................ 414/546
2003/0108412 A1 * 6/2003 Zimmer ...................... 414/522
2003/0127261 A1 * 7/2003 Borroni-Bird et al. ..... 180/65.1

* cited by examiner

COUPLING SYSTEM FOR ATTACHMENT OF A SEAT TO ALLOW SECURING AND/OR LIFTING THEREOF

CROSS-REFERENCE TO RELATED APPLICATIONS

The present invention claims priority from U.S. Provisional Application Ser. No. 60/318,911, entitled "Wheelchair Attachment System," filed Sep. 13, 2001; U.S. Provisional Application Ser. No. 60/293,663, entitled "Chair Lift System For A Mobility Vehicle," filed May 25, 2001; U.S. Provisional Application Ser. No. 60/293,673, entitled "Wheel Chair Lift Mechanism Into Mobility Vehicle," filed May 25, 2001; U.S. Provisional Application Ser. No. 60/317,008, entitled "Personal Mobility Vehicle," filed on Sep. 4, 2001; and U.S. Provisional Application Ser. No. 60/293,849, entitled "Assisted Entry Seating Structure For A Mobility Vehicle," filed May 25, 2001.

TECHNICAL FIELD

The present invention relates generally to a coupling system, including a coupling device and an engagement device for mating attachment of a seating device to a securing or lifting device to allow the seating device to be secured and/or lifted relative to transportation and/or architectural movement needs. More particularly, the present invention relates to a coupling device fixedly secured to, or integrally embodied in, the frame of a wheelchair or other seating device to allow the wheelchair or seating device, while occupied, to be secured in position and/or lifted or lowered in elevation.

BACKGROUND OF THE INVENTION

It has been a consistent challenge for wheelchair users, mobility device users, and those that assist them, to secure their wheelchairs and/or mobility devices in a stable position in a moving vehicle, while the user is seated therein. Current known systems utilize a strap or latch system that secures the wheel, axle, and/or frame of the wheelchair within a vehicle through the use of strap and tie down methods. While these systems and methods are universal in their ability to accommodate a wide range of differing wheelchair designs, they are typically cumbersome and time consuming for users and their assistance personnel. Moreover, these systems typically cannot be performed alone by a person confined to or otherwise seated within a wheelchair or mobility device and therefore require the assistance of another person. This is because a person seated in the wheelchair or mobility device typically cannot reach the strap and tie down systems.

Systems that clamp the wheels of a wheelchair for securing thereof have been developed. These systems are designed to engage the wheels automatically or upon activation. However, restraint of a wheelchair by the wheels does not provide a satisfactorily rigid connection of the wheelchair seat or seating device to a transportation vehicle, particularly in the event of rough terrain or an accident. Further, these wheel clamp systems also take up considerable space within the transportation vehicle. Therefore, it would be advantageous to provide a universal system for coupling and effectuating elevation changes of a seating device and/or wheelchair that includes a simple rigid connection for securing the wheelchair and/or seating device in a stationary position. In the case of a public transportation bus, for instance, it is known that present developments for wheelchair clamping devices addressing the deficiencies of tie down systems take up a significant amount of space, thereby decreasing the effective area, where the predominant use is not related to those of disability or limited mobility. It would be desirable to provide a system that also overcomes this disadvantage.

Moreover, it is also a known challenge for wheelchair users, mobility device users, and those that assist them, to lift their wheelchair and/or other mobility device from the ground up into a vehicle or other mode of transportation, or to negotiate level changes within an architectural structure, such as a building. As is known, a large amount of effort and/or mechanical assistance is required to assist or lift a person from ground level to a driving or riding position in a vehicle. This is true for a person that has some physical impairment that limits their ability to climb into a vehicle, such as for example, a person with a walker or a cane. This is equally true for those that are not physically able to climb into a vehicle, including those that require a wheelchair. Moreover, significant effort and/or mechanical assistance is also required to lift or lower a person of physical disability from one elevation to another within any architectural building.

Most current systems that provide assistance in elevating a person in a wheelchair or seating device to a driving or riding position, such as is required for entry into a vehicle, require that the wheelchair or seating device be positioned on a platform or similar structure, which is then lifted with the person seated thereon, to raise them to the level of the vehicle. These platform type systems typically require a large amount of space and are therefore costly and disadvantageous. Further, after the wheelchair or seating device has been lifted, the wheelchair or seating device must further be moved into position and then secured within the vehicle. This typically requires that the wheelchair or seating device be latched in position through tying down of the wheel or the axle, as discussed above. Only after the wheelchair or seating device has been secured, can the vehicle be operated safely for the occupant of the wheelchair or seating device.

Several current lifting systems are available that can transfer a person from a position on ground into a vehicle. These lifting systems include a lifting seat that is an integral part of the lifting system. These systems thus require the physical transfer of the person from their wheelchair or seating device into the lifting chair. On ce the person is located in the lifting seat, the seat is lifted and rotated by the lifting system to a secure position within the transportation mode. These systems also require the step of storing the now unused wheelchair or seating device in the vehicle by an aiding attendant before vehicle operation, such that they can be used again by the person when unloaded from the lifting seat. This is thus not a system that can readily be used independently by the user.

It would therefore be advantageous to provide a coupling system that would place a lifting system in communication with a wheelchair and enable both the lifting and securing steps of the wheelchair to easily allow persons that require the use of a wheelchair to enter and exit the vehicle as compared to current systems. In the case of an able, or limited mobility person, it would also be advantageous to provide a coupling system for use with a seating element instead of a wheelchair that secures and lifts the seating element. At present, there are no known systems that can accommodate different seating configurations and thus allow for adaptation to a person's changing mobility capabilities or to the abilities of another user.

There presently exists no universal rapidly deployable rigid system for use in securing and/or effectuating elevation changes of seating devices or wheelchairs. It would therefore be desirable to provide a universal wheelchair coupling device that can be utilized with different attachment devices and lifting structures employed by different vehicles and/or architectural applications. Current universal lift platform devices for rapidly deploying and lifting wheelchairs and/or other seating devices require significant space and are not efficient for use in vehicles, boats, bus, and architectural settings where the predominant use is not related to those of disability or limited mobility. It would thus be desirable to provide a coupling device that allows for universal attachment to more compact systems capable of use with a wider variety of vehicles and also requiring less devoted space.

SUMMARY OF THE INVENTION

It is therefore an object of the present invention to provide a coupling system that allows a wheelchair and/or other mobility seating device to be readily lifted by a mechanical apparatus into a vehicle and retained in a secure position within the vehicle.

It is another object of the present invention to provide a universal coupling system that allows a wheelchair and/or other seating device to be secured and lifted by a mechanical apparatus such that it remains secured during the lifting operation with respect to a variety of different modes of transportation, including automobiles, buses, boats, stairs, personal mobility vehicles, and other similar devices and structures.

It is a further object of the present invention to provide a universal coupling system that is intended to communicate with a lift mechanism such that its configuration takes up significantly less space than prior lift mechanisms.

It is a still another object of the present invention to provide a coupling system that includes a securing feature that allows a wheelchair to be lifted from ground into a vehicle and secured within the vehicle without the need to secure the wheel of the wheelchair or the frame secondarily.

It is still a further object of the present invention to provide a coupling system that can be utilized with various seating modules, devices and personal platforms, including wheelchairs and power wheelchairs.

It is a related object of the present invention to provide a coupling system that allows for relatively efficient attachment of a wheelchair or other seating device to a lift mechanism as compared to prior attachment mechanisms.

It is yet another object of the present invention to provide a coupling system that readily facilitates unattachment of the mating engagement device incorporated in the coupling system as the wheelchair or seating device is in the final stage of lowering such that the seating device or wheelchair can readily move away from the system or vehicle when lowered to exit height. In the case of unattachment of a seating module, the removal of the seat module is effected easily for removal thereof and ready accommodation of another seating module, device, or personal platform, including wheelchairs and power wheelchairs.

It is still a further object of the present invention to provide a coupling system having an electrical signal coupling component that allows the wheelchair user's controls to mate to the lift mechanism and the vehicle controls for subsequent control of the lift mechanism and the vehicle with the user's wheelchair controls.

In accordance with that above and the other objects of the present invention, a universal coupling system is provided. The universal coupling system includes a coupling device that is intended to be secured to or formed integrally with the frame of a chair device, such as a comfort chair unit or a wheelchair. The coupling device includes at least one attachment structure formed thereon for mating with a corresponding engagement device formed on an associated lift mechanism or a location securing device utilizing the coupling system's universal attachment standards. In the case of utilization with a lifting mechanism, the coupling device is intended to mate the structure on the chair device with the corresponding engagement device on the lift mechanism and locationally secure the chair device in space for lifting. Thereafter, the chair device is raised to an elevated position while the chair device is occupied. The coupling system is configured such that complete stability of the chair device relative to the lift mechanism is maintained during the lifting operation. The coupling device preferably includes one or more aligning devices to facilitate tolerance of the coupling process or chair device misalignment during the coupling process. It will be understood that the effective elements of the coupling device, the engagement device, and the aligning devices may be located either on the engagement device or the coupling device.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
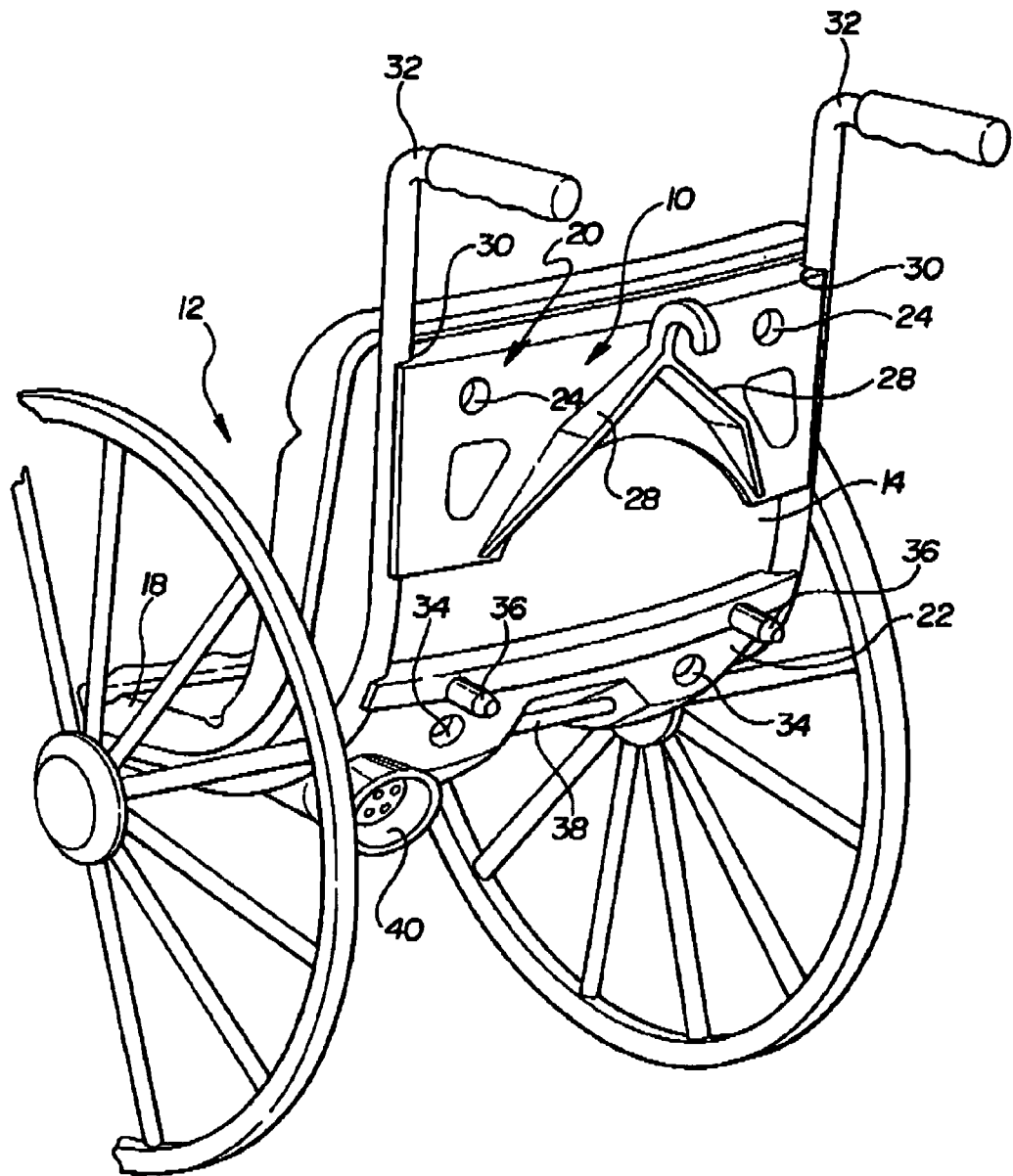
FIG. 1 is a perspective view of a coupling device incorporated into a wheelchair, the design of which, could equally be used on other seating devices, to effectuate securing and lifting thereof in accordance with a preferred embodiment of the present invention.

Referring now to FIG. 1, which illustrates a preferred coupling device 10, which is part of a coupling system 5 in accordance with the present invention. The coupling device 10 is preferably secured to the chair frame of a wheelchair 12. More preferably, the coupling device 10 is secured to the seat back 14 of the chair frame. It will be understood that the coupling device 10 may alternatively be secured to the seat bottom 18 of the chair frame. The coupling device 10 may be attached on a combination of the seat back 14 and the seat bottom 18 or a variety of other locations on the wheelchair 12 or combination thereof. However, the coupling device 10 is attached to the wheelchair 12 independently of the wheels. In other words, the coupling device 10 is secured to the wheelchair 12, such that it effects a rigid connection and does not interfere with any normal function of the wheelchair 12.

The coupling device 10 is preferably attached to the chair frame by welding. However, the coupling device 10 may alternatively be attached to the wheelchair 12 by any known attachment or securing mechanism. While the coupling device 10 is preferably secured to the wheelchair 12, it may alternatively be integrally formed with the wheelchair 12, such as in the seat back structure 14 or the seat bottom structure 18 or a combination thereof. Moreover, while the coupling device 10 is preferably shown and described for use with a wheelchair 12, it is intended, and will be understood that the coupling device 10 may be secured to, or integral with and utilized by a power wheelchair, a mobility device or other seating structure.

The coupling device 10 is preferably comprised of an upper plate 20, which is secured to the seat back 14, and a lower plate 22, which is also preferably secured to the seat back 14. The upper plate 20 and the lower plate 22 are preferably comprised of a metal material, however, it will be understood that the plates 20, 22 may instead be formed of a plastic material, such as through known injection or compression molding processes. Similarly, the plates 20, 22 and the chair may be formed in a single process. Alternatively, the plates 20, 22 may be formed from a variety of other suitable materials. While the plates 20, 22 are illustrated as two separate pieces, it will be appreciated that they may be formed as a single plate or more than two. Further, while the plates 20, 22 are shown attached to the seat back 14, it will be understood that they can be attached, either entirely or partially, to other portions of the wheelchair 12.

The upper plate 20 preferably has a plurality of through holes 24 which allow attachment to secure various seat back cushions to the seat back 14. The upper plate 20 also preferably includes a hook latch 26 that is integrally formed with one or more load distributing structural elements or shapes 28 that provide support integrity to the hook latch 26. The hook latch 26 and the supporting elements 28 are each also integrally formed with the upper plate 20. The upper plate 20 also preferably includes a channel 30 formed in either side of the upper plate 20 that allows the upper plate 20 to be welded to each of the arm handles 32 of the wheelchair 12.

The lower plate 22 preferably also has a plurality of through holes 34, which allow attachment to secure various seat back cushions to the seat back 14 of the wheelchair 12. The lower plate 22 also includes at least one guide pin 36, which protrudes generally outwardly therefrom, and a clamp bar 38. The lower plate 22 also includes an electrical signal and/or power connector component 40. The electrical power signal and/o r power connector component 40 is in communication with the various controls that are present on the wheelchair, seating device or powerchair 12, as will be understood by one of skill in the art.

Figure 2B:
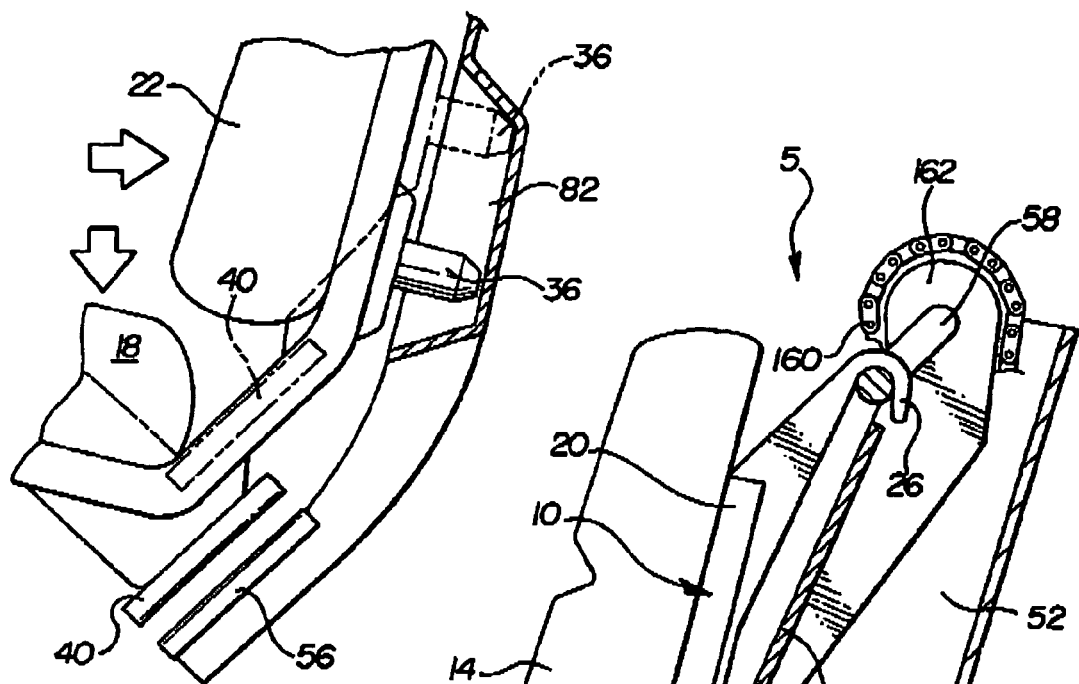
FIG. 2B is a schematic illustration of a portion of a coupling system, which could be utilized instead of the corresponding portion located within the circle of FIG. 2A.
Figure 2A:
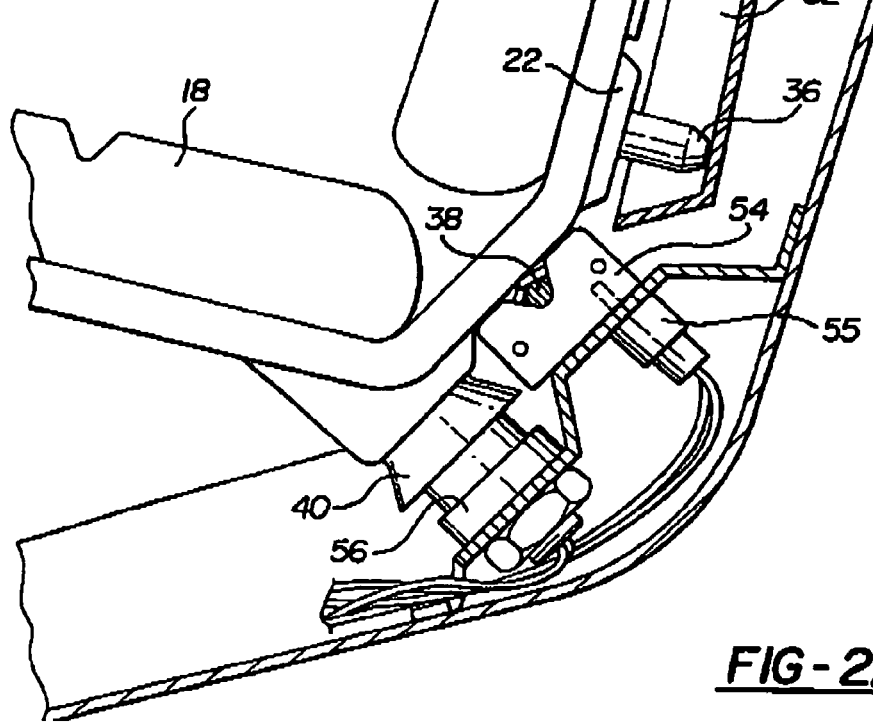
FIG. 2A is a schematic side view partially broken away of a coupling system, including a coupling device that is mated to an engagement device on a lift mechanism, in accordance with a preferred embodiment of the present invention.

FIG. 2A illustrates the preferred coupling system 5, which embodies the mating engagement of the coupling device 10 to an engagement device 50. As shown, the engagement device 50 is preferably secured to an associated lift mechanism 52 and includes a latch 54, which is intended to receive and lock the clamp bar 38 therein. The latch 54 secures the clamp bar 38 when in an engaged position to secure the wheelchair 12 to the lift mechanism 52. The latch 54 thus locks the clamp bar 38 when the lift mechanism 52 is seated in a desired operating position within the vehicle 110. The latch 54 is in communication with a device 55 that will release the clamp bar 38 when the lift mechanism 52 is being activated to allow movement of the attached chair in a path that is determined by the lift mechanism, such as for lowering to a ground engaging position for ready uncoupling of the chair 12. It is understood that latch 54 could be located on the engagement device 50, if engagement device 50 is provided with full mechanical restraint of motion to effectuate securing of the wheelchair 12.

The engagement device 50 also preferably includes an electrical signal and/or power receptor device 56, which is intended to mate with the electrical signal and/or power connector component 40, such that the controls used to operate the wheelchair 12 can be utilized by the user to operate the lift mechanism 52 and/or the vehicle into which the wheelchair 12 is being lifted. The engagement device 50 also includes a supporting rod 58, that is intended to engage the hook latch 26, and at least one channel 60 that is intended to receive a respective guide pin or pins 36 therein, as is discussed in more detail below. The connection of the wheelchair controls to the lift mechanism 52 can be accomplished in a variety of other ways, including mechanical, electrical, infrared, or other known communication methods.

As shown in FIG. 2A, the electrical signal power connector device 56 remains in the vehicle 110 and mates with the connector component 40 when the wheelchair 12 is located in the vehicle. However, as shown in FIG. 2B, the electrical signal and/or power connector device 56, which is shown as an infrared connector may also be located on the lift mechanism 52. Thus, the electrical signal and/or power connector component 40 may thus be located on the lift mechanism 52 or may remain fixed within the interior of the vehicle.

The mating of the coupling device 10 with the engagement device 50 allows the wheelchair 12 to be secured to the lift mechanism 52 and maintained in a secure position during the lifting process. The coupling system 5, through the features of the coupling device 10 and the engagement device 50, including the guide pin or pins 36 and the tapered path of the hook latch 26 provide centering capability. It will be understood that a variety of other similar configurations for accommodating coupling tolerance are possible for locating the coupling device 10 for proper engagement with the engagement device 50. Moreover, while the coupling device 10 has been illustrated on the wheel chair 12, it will be understood that the elements of the coupling device 10 may instead be located on the lift mechanism 52. In that event, it will also be understood that the elements of the engagement device 50 will be located on the wheelchair 12 such that the functions of the coupling system 5 are maintained. Further, the specific configurations of the coupling device 10 and the engagement device 50 may obviously vary.

The coupling device 10 is preferably universal in that while it has been shown illustratively incorporated into a wheelchair, it may also be utilized with a variety of other seating devices, including power wheelchairs, assistive seating devices, future wheelchair developments and/or seating modules. As will be understood, the engagement device 50 preferably embodies a locking device that secures the coupling system 10 after the centering features of the system 5 have mated the coupling device 10 to the engagement device 50 or after the lift mechanism 52 is in the vehicle operation position.

The configuration of the coupling device 10 allows it to be used in a variety of ways. For example, the engagement device 50 may be manipulated by the lift mechanism 52 toward engagement with the wheelchair 12. Alternatively, the wheelchair 12 may be maneuvered into contact with the engagement device 50. Moreover, the coupling device 10 can be used for a variety of purposes, including for securing the seating device within a moving vehicle, or for attachment to the lift mechanism 52 for lifting or moving the seating device, or for attachment to another lifting system, such as utilized in a hunter's tree stand device.

Referring now to FIGS. 3 through 6, which illustrate another exemplary embodiment of a coupling system 5, including a coupling device 10 and a corresponding engagement device 64. In this embodiment, the coupling device 62 is secured to or integral with the seat back 66 of a seating device 68. The coupling device 62 preferably has an upper plate 70 and a lower plate 72. Again the plat es 70, 72 can be found in various shapes, in a single or multiple pieces and can be formed of a variety of materials, such as set forth above in connection with the plates 20, 22.

The upper plate 70 preferably has a plurality of through holes 74 which allow attachment to secure various seat back cushions to the seat back 14. The upper plate 70 includes a support bar 78 formed in a channel 80 thereof. The channel 80 is defined by a pair of opposing flanges 82 that have inner surfaces 84 that taper inwardly from the bottom towards the support bar 78 for the purposes of alignment in the coupling process. The flanges 82 are preferably integrally formed with the upper plate 70. The upper plate 70 is preferably attached to the seating device 68 by welding, but can be attached by a variety of other ways. Alternatively, the upper plate 70 can be integrally formed with the seat back 66 or the seating device 68.

The lower plate 72 preferably has a plurality of through holes 86, which allow attachment to secure various seat back cushions to the seat back 14. The lower plate 72 also includes at least one guide pin 88 protruding generally outwardly therefrom and a clamp bar 90. The lower plate 72 also includes an electrical signal and/or power connector component 92, which is in communication with controls on the seating device 68, as will be understood by one of skill in the art. The lower plate 72 is also preferably attached to the seating device 68 by welding. However, the lower plate 72 may be secured to the seating device 68 in a variety of ways, including being integrally formed with the seat back 66 or the seating device 68.

Figure 4:
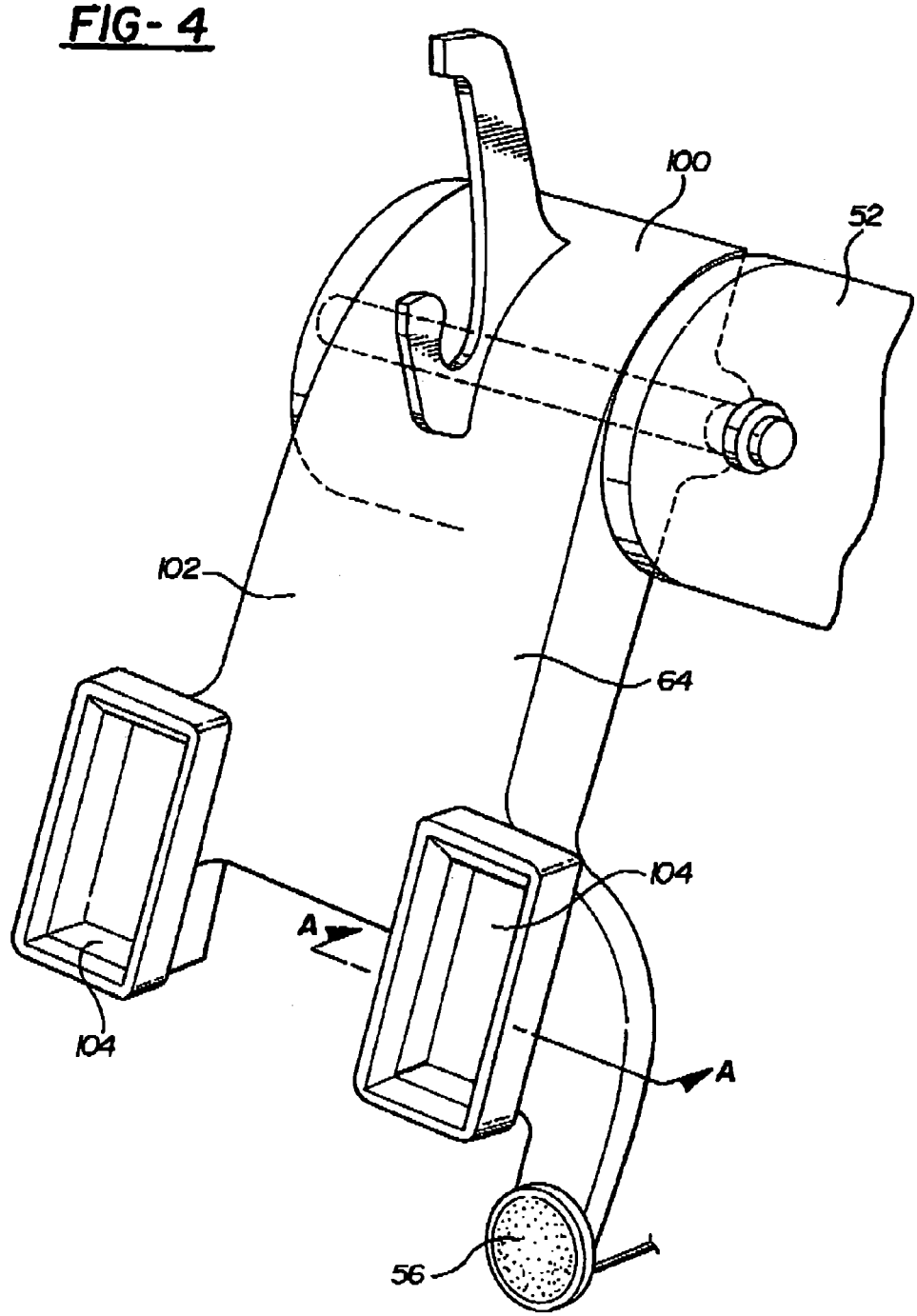
FIG. 4 is a perspective view of an engagement device for a lift mechanism for communication with the coupling device of FIG. 3 in accordance with a preferred embodiment of the present invention.
Figure 5:
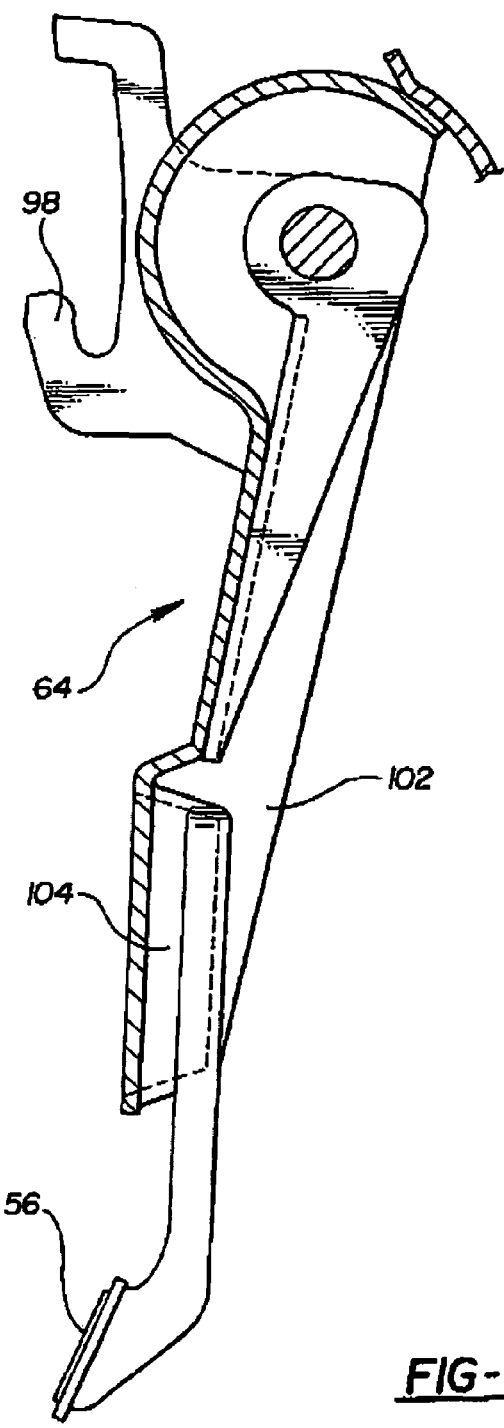
FIG. 5 is a side view of the engagement device of FIG. 4.
Figure 6:
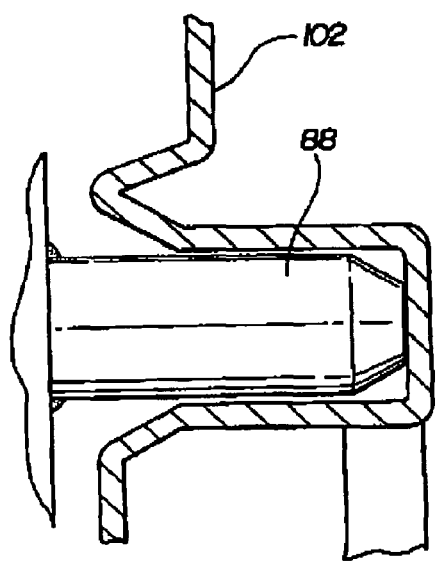
FIG. 6 is a cross-sectional top view of a portion of the engagement device of FIG. 4 along the lines A-A of FIG. 4.

FIGS. 4 through 6 illustrate the corresponding engagement device 64 of the coupling system 5. The engagement device 64 as shown preferably is integrally in association with a lift mechanism 52. It is also understood that the engagement device 64 could be mechanically attached to the lift mechanism 52. The engagement device 64 is preferably constructed of a metal material, such as steel, but a variety of other materials and composites may be used. A hook latch 98 is preferably integrally formed as part of the engagement device 64 to communicate with the support bar 78 on the coupling device 10 to effectuate lifting of an attached seating structure. The engagement device 64 in this lift mechanism example is secured to a support shaft 100 at either end thereof. The support shaft 100 is preferably rotatable about its central axis and is controlled by the lift mechanism 52 to effectuate maintaining the coupling system 5 and attached seating structure level during actuation of the lift mechanism 52.

It is understood that the engagement device 64 may be constructed by utilizing a combination of materials that are mechanically connected. The body portion 102 also includes at least one guide channel 104 that is each intended to receive a respective guide pin 88 from the coupling device 62 therein. As shown in FIG. 6, the channel 104 is configured to match the shape of the guide pin 88. The function and uses of the coupling device 62 and the engagement device 64 are the same as described above in connection with the embodiment of FIGS. 1 and 2. As will be appreciated, the various components that make up the coupling system 5 can be located on either the coupling device 62 or the engagement device 64.

Figure 7:
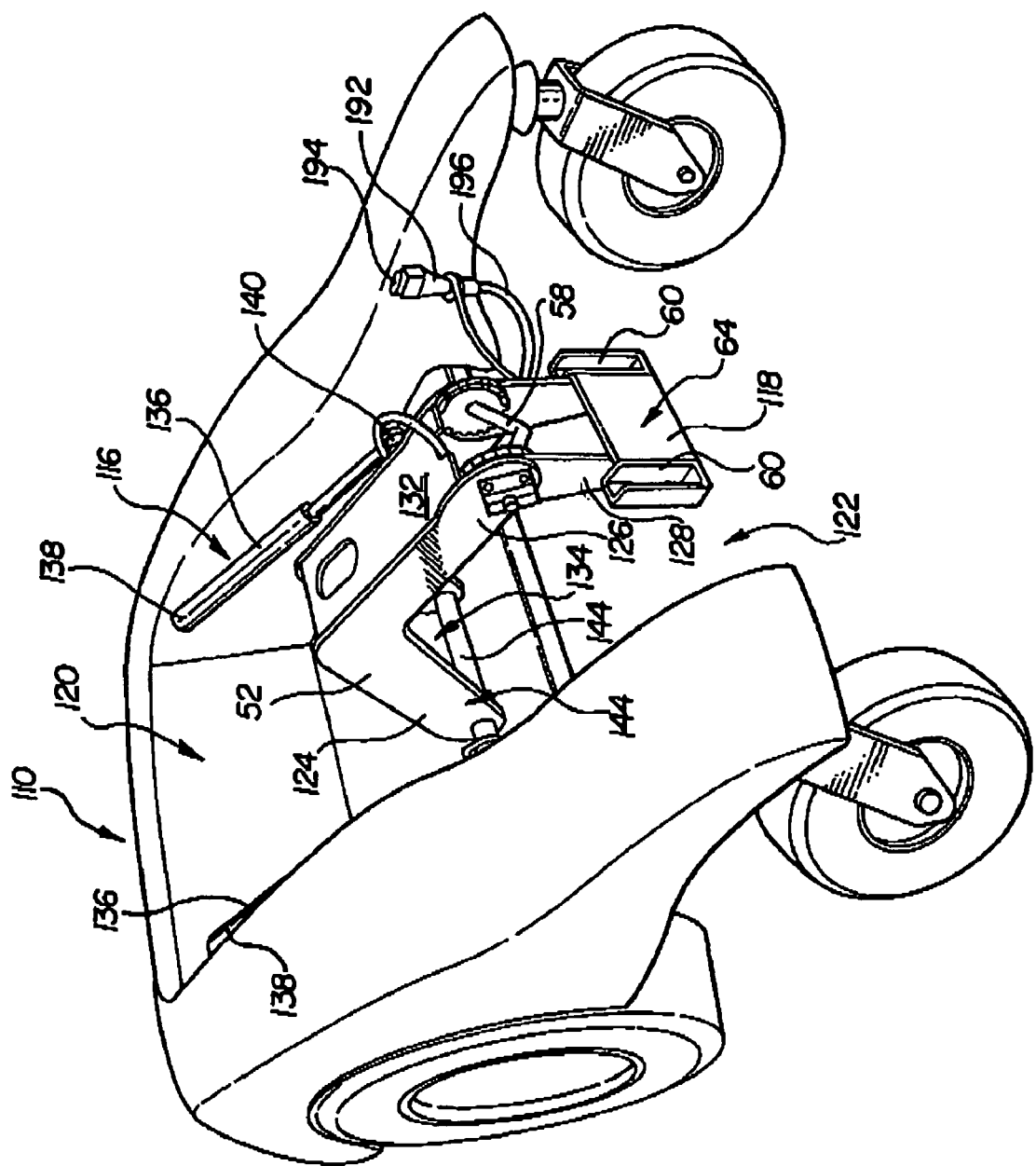
FIG. 7 is perspective view of a modular vehicle having a lift mechanism disposed therein employing an engagement device of a coupling system in accordance with a preferred embodiment of the present invention.
Figure 8:
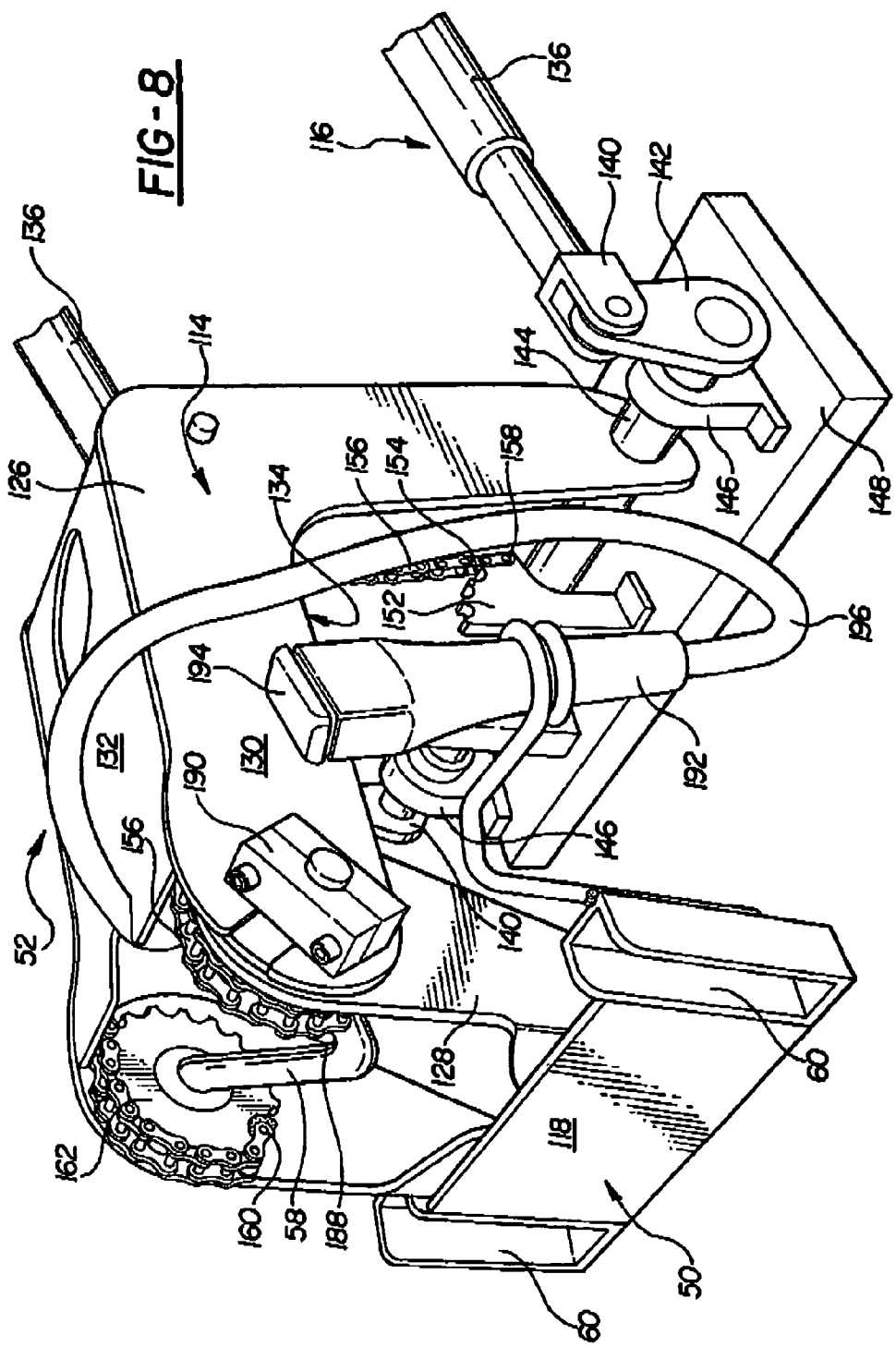
FIG. 8 is perspective view of a lift mechanism employing an engagement device of a coupling system in accordance with a preferred embodiment of the present invention.

Referring now to FIGS. 7 and 8, which illustrates use of an embodiment of the universal coupling system 5 within the context of an open front mobility vehicle 110. The mobility vehicle 110 preferably incorporates the lift mechanism 52 therein, having the engagement device 64 located thereon for attachment to a coupling device 62. The lift mechanism 52 includes a lift arm 114, an actuator 116, and a lift component 118 utilizing the engagement device 64. The mobility vehicle 110 in this illustration of use has an interior 120 and an open front 122. Here, the interior 120 serves as a passenger compartment with a passenger entering the vehicle through the open front 122. An open front 122 is preferably utilized as it allows the lift mechanism 52 to extend forwardly out the open front 122 of the vehicle 110 to engage a seating device and retract it into the interior 120 without any interfering structure. However, the vehicle 110 could instead have an open back with the lift mechanism 52 extending out of the vehicle rearwardly to engage a seating device and bring it into the vehicle interior 120. Further, the lift mechanism 52 can also be configured to extend out the side of the vehicle 110. The interior 120 may alternatively serve as a storage compartment to house items lifted by the lift mechanism 52, which also could utilize the coupling system 5 as a method of attachment of the storage compartment.

The lift arm 114 has a rear portion 124, a main arm portion 126 extending generally forwardly from the rear portion 124, and a face plate portion 128 that extends generally downwardly from the main lift arm portion 126. The lift arm 114 also includes a pair of opposing side portions 130 and a top portion 132 that extends between the pair of opposing side portions 130. The top portion 132 preferably does not extends over the face plate portion 128. The pair of opposing side portions 130 and the top portion 132 define a hollow interior portion 134 in the rear portion 124 and the main lift arm portion 126 of the lift arm 114. The rear portion 124 is preferably in mechanical communication with the actuator 116. As shown, the actuator 116 is preferably an electrical actuator. The actuator 116 preferably includes a pair of electric actuators 136, however, it will be understood that the actuator 116 could be comprised of only a single actuator. As will be also understood, the actuator 116 may be driven by any other known actuation means, including hydraulic actuation, pneumatic actuation or any combination thereof. As will be understood, the vehicle 110 can have an enclosure module or other structure covering the interior, such that when in place, the movement of the lift arm is retarded. In accordance with the preferred embodiment, actuation of the lift arm would also preferably move this structure out of the way to provide an unobstructed path for the lift arm 114.

As shown best in FIG. 8, each of the pair of electric actuators 136 has a first end 138 that is preferably secured within the vehicle 110 and a second end 140 that is in communication with a respective lever arm 142. An axle 144 is fixedly secured to each of the lever arms 142 at a respective end thereof. The axle 144 passes through a respective bushing 146, located adjacent each of the lever arms 142 to provide support therefor. The axle 144 is fixedly secured to each of the opposing side portions 130 of the lift arm 114. Each of the bushings 146 is secured to a mounting plate 148, which is secured within the vehicle 110.

A pair of cam sprockets 152 are preferably secured to the mounting plate 148 and are also preferably located within the hollow interior portion 134. Each of the cam sprockets 152 has a plurality of teeth 154, which are intended to engage a respective chain 156 as the lift arm 114 travels forwardly and rearwardly through its range of motion. Each of the chains 156 has a rearward end 158 fixedly attached to one of the pair of cam sprockets 152 and a forward end 160, which is attached to a respective lift sprocket 162. Each of the lift sprockets 162 is preferably located within the hollow interior portion 134 and controls the relative motion between the main lift arm portion 126 and the face plate portion 128 of the lift mechanism 52.

As shown in FIG. 8, each of the cam sprockets 152 is fixedly secured to the mounting plate 148 and is disposed at least partially around, but does not engage, the axle 144 which allows the axle 144 to rotate with respect to the cam sprockets 152. The cam sprockets 152 govern the relative motion of the face plate portion 128 with respect to the main lift arm portion 126 during the operation of the lift arm mechanism 52. While the coupling device 62 is mated to the engagement device 64, the lift sprockets 162 and the coupled chains 156 govern the relative orientation of the face plate portion 128 to the main lift arm portion 126 and maintain the coupled device 62 and the corresponding chair device in a stable horizontal orientation during the elevation process. It will be understood that while a pair of sprockets and two chain mechanisms are preferably utilized for purposes of safety and redundancy, the same functions can be achieved by a single sprocket and chain mechanism.

Figure 9:
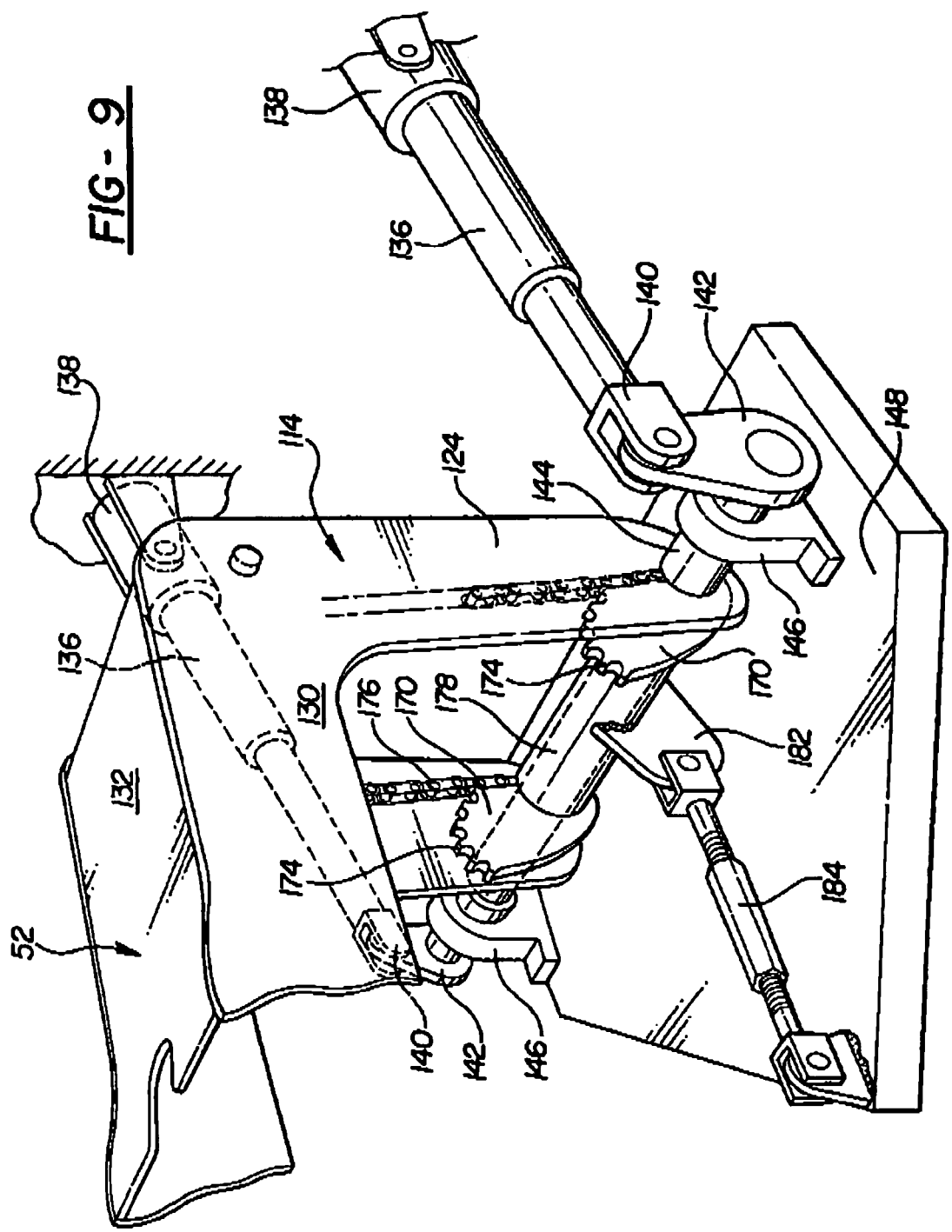
FIG. 9 is a perspective view of a lift mechanism employing an engagement device of a coupling system having a tilt feature in accordance with another preferred embodiment of the present invention.

Referring now to FIG. 9, which illustrates another embodiment of a lift mechanism 52 in accordance with the present invention. The configuration of the electric actuators 136, the lever arms 142, the bushings 146, and the lift arm 114 are the same as discussed above, and are therefore not re-described. As shown, the lift mechanism 52 in this embodiment includes a pair of rotating cam sprockets 170, which are rotatably secured to an assembly 172 which is rotatable with respect to the axle 144. Each of the pair of rotating cam sprockets 170 has a plurality of teeth 174, which are intended to engage a respective one of the chains 176. Each of the chains 176 is attached at one end 178 to a respective one of the pair of rotating cam sprockets 170 and at the other end to a respective one of the lift sprockets 162. The assembly 172 has a lever portion 182 fixedly secured to an outer surface thereof. The lever portion 182 is in communication with a sprocket actuator 184. The assembly 172 is secured at either end to the rotating cam sprockets 170 and is disposed around the axle 144, such that the axle 144 supports the independent pivoting of the assembly 172 thereon.

The sprocket actuator 184 is preferably an electric actuator, which is secured to the mounting plate 148 or directly to the vehicle structure 110. However, again it will be understood that the sprocket actuator 184 may be driven by any other known actuation means, including manual screw, hydraulic actuation, pneumatic actuation or any combination thereof. The sprocket actuator 184 pushes the lever portion 182, which causes the assembly 172 to rotate with respect to the axle 144. The movement of the assembly 172 causes the rotating cam sprockets 170 to rotate which pulls or releases the chain 176 and thereby turns the lift sprockets 162. The rotation of the lift sprockets 162 allows the inclination of the face plate portion 128 to be changed with respect to the main lift arm portion 126. In other words, the angle of the lift plate 118 is varied to effectuate tilting of the coupled seating device, as is discussed in more detail below. This allows the coupled seating device to recline for relaxation purposes and also allows the seating device to tilt forward to allow a person of limited mobility to enter or exit the seating device more easily.

The face plate portion 128 preferably has a generally flat front surface 118. As shown in FIG. 8, the front surface 118 of the face plate portion 128 is part of the engagement device 64, which also preferably includes the pair of channels 60 located on either side thereof. As discussed above, the pair of channels 60 are intended to engage the guide pin or pins 36 of the coupling device 10. Additionally, the support rod 58 extends between the pair of lift sprockets 162. The support rod 58 is preferably "v" shaped such that a downward bend 188 is formed therein to provide a structure for coupling with the hook latch 26 on the coupling system 10. The support rod 58 is secured to the face plate portion 128 and to each of the lift sprockets 162. The support rod 58 also pivotally engages a bearing block 190 on either end thereof to provide a rotation axis for the supporting rod 56 and face plate portion 128.

The lift mechanism 52 also includes a control handle 192 which controls the actuation of the lift arm 114. The control handle 192 has at least one button 194 thereon that is in electrical communication with the actuator 116 through the wires encased within the cord 196. It will be understood that the control handle 192 may contain a variety of other buttons, including a tilt button to control actuation of the sprocket actuator 184 and thus the movement of the face plate portion 128 with respect to the main arm portion 126. Thus, any number of buttons may be utilized. It will be understood that the control button 192 or control buttons may be located in a multitude of locations that are advantageous to the design configuration for easy use. It is understood that in the event that existing wheelchair controls are used in communication with lift mechanism 52 through an electrical signal and/or power connector component 40 and electrical signal and/or power receptor device 56, that the control handle 192 need not be utilized.

Figure 3:
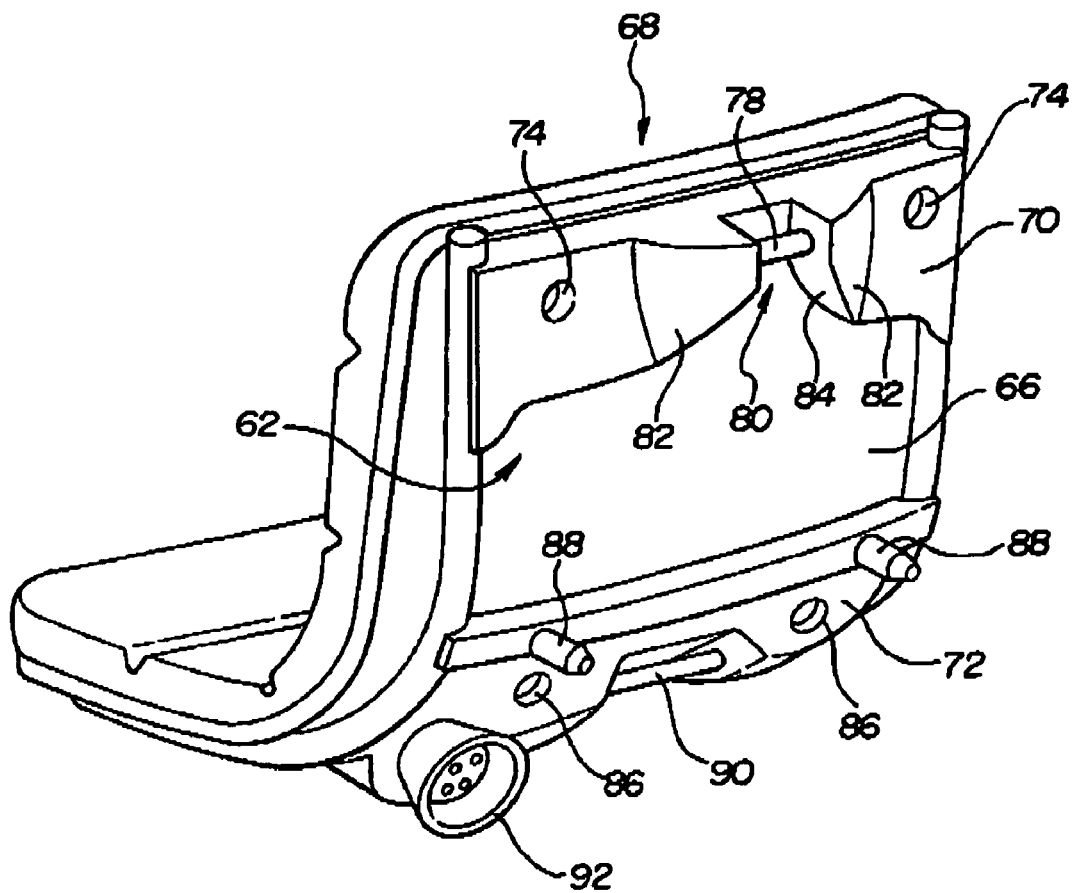
FIG. 3 is a perspective view of a coupling device incorporated into a seating device, which equally could be used on a wheelchair, in accordance with a preferred embodiment of the present invention.
Figure 10:
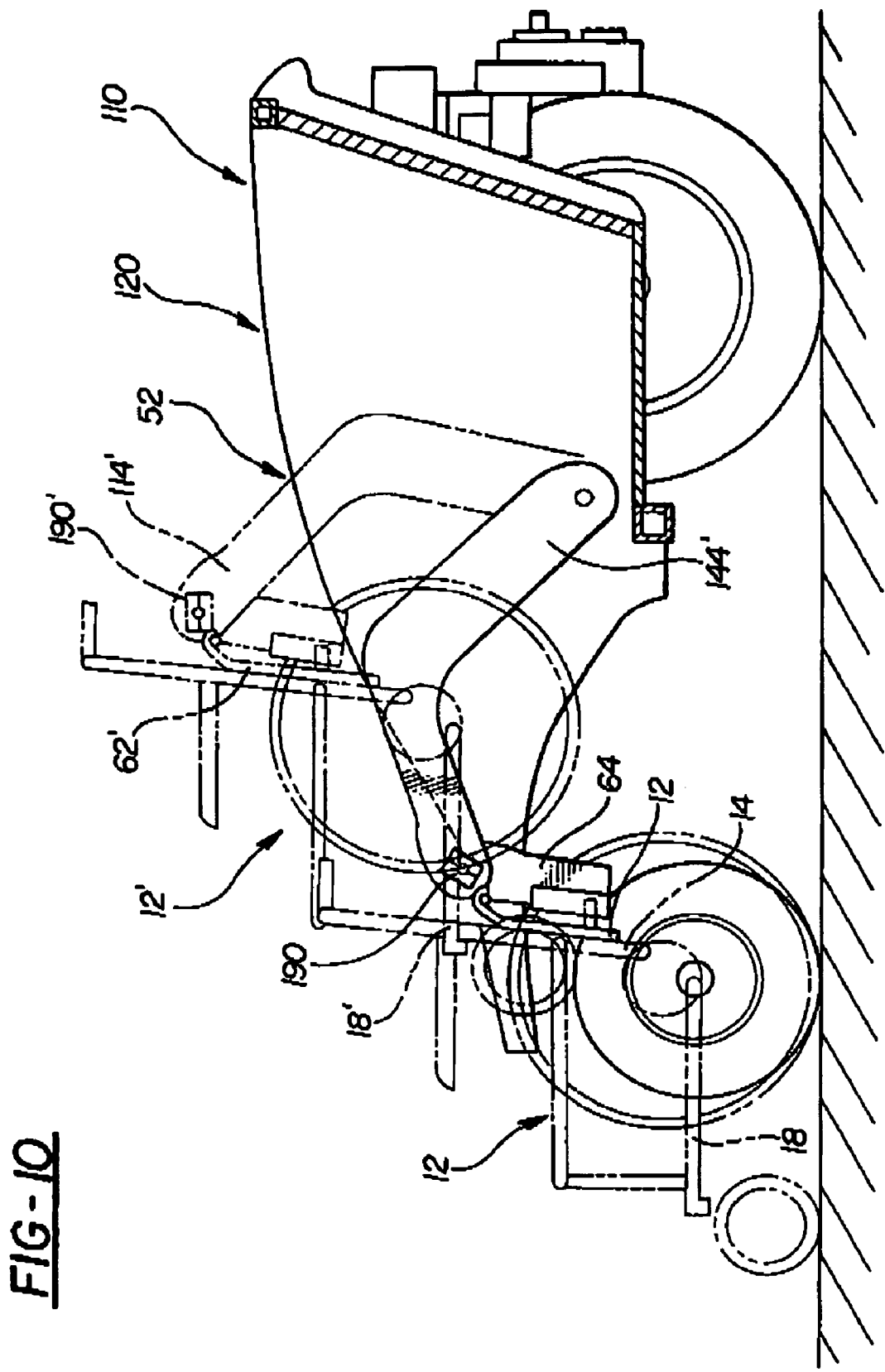
FIG. 10 is a schematic illustration of a lift mechanism lifting a wheelchair or seating device from a ground engaging position to an intermediate elevated position in accordance with a preferred embodiment of the present invention.
Figure 11:
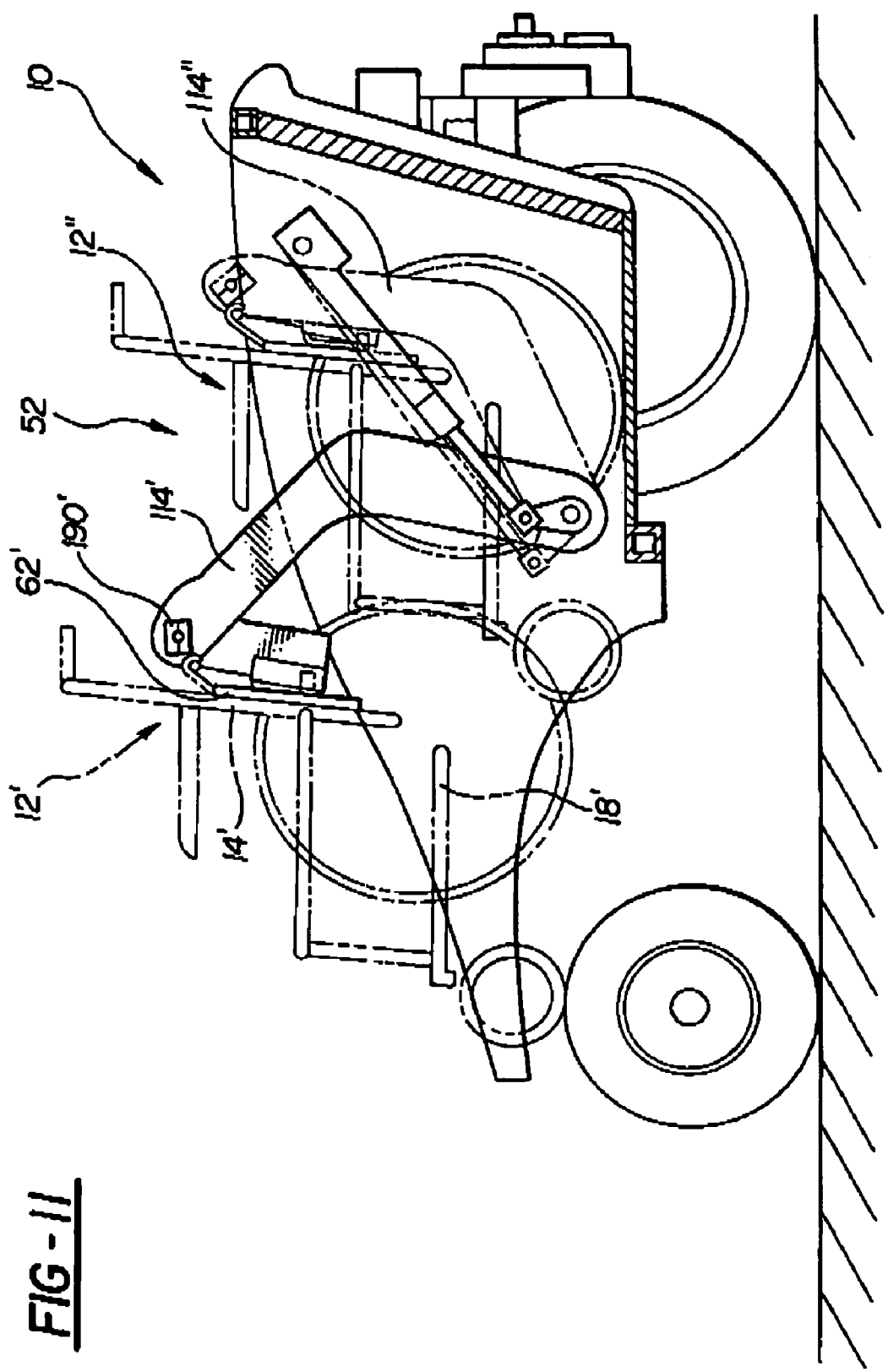
FIG. 11 is a schematic illustration of a lift mechanism moving a wheelchair or seating device from an intermediate elevated position to a final position within a mobility vehicle.
Figure 12:
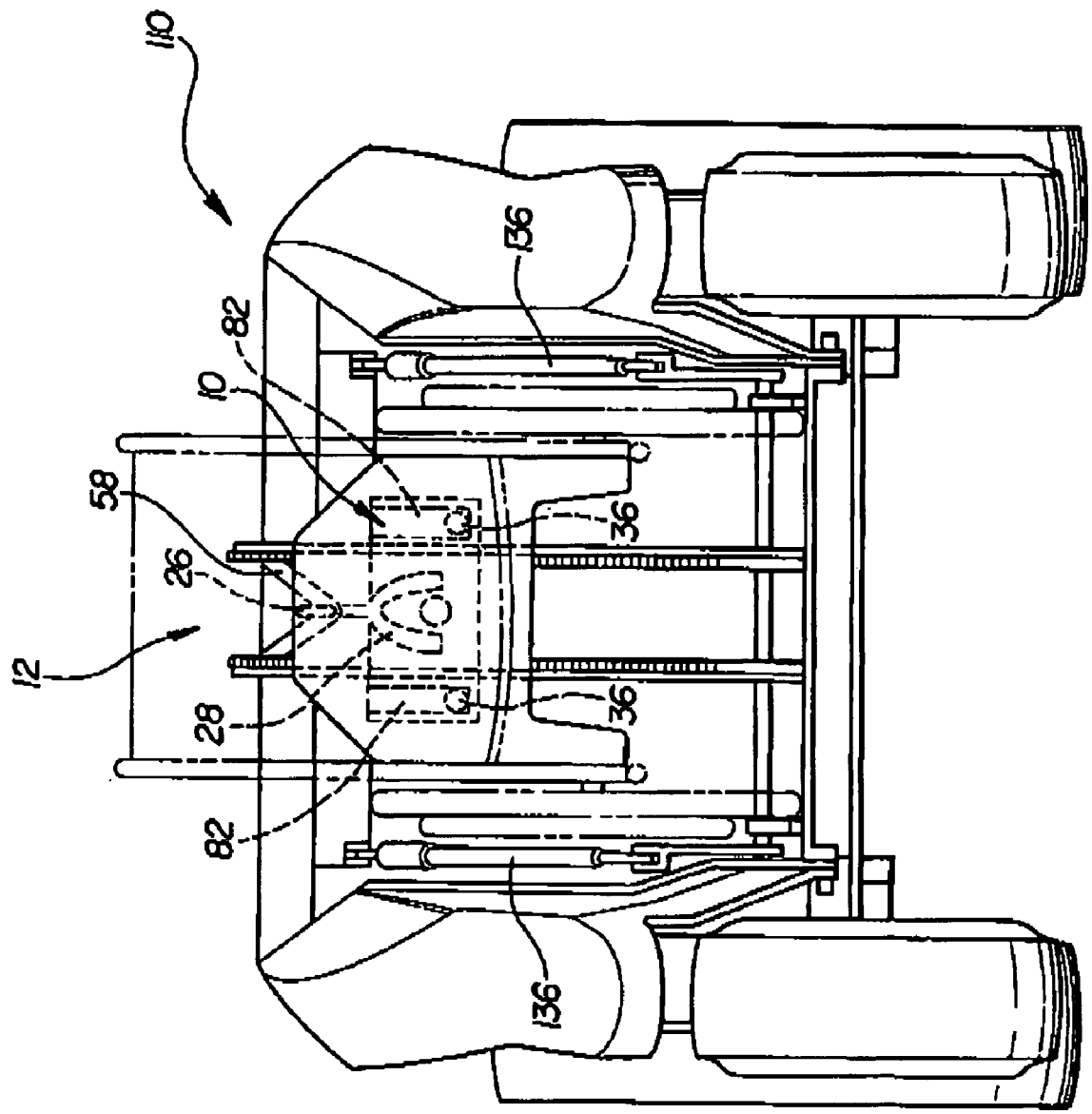
FIG. 12 is a front view of a lift mechanism employing an engagement device to be mated with a coupling device for securing a wheelchair or seating device within a mobility vehicle in accordance with a preferred embodiment of the present invention.

Referring now to FIGS. 10 through 12, which illustrate the movement of the lift arm 114 between a fully retracted position and a fully extended position. The lift arm 114 and the associated lift mechanism 52 are illustrated as incorporated into a mobility vehicle 110. However, as discussed in detail below, the lift arm 114 can be utilized for a variety of purposes and incorporated into a variety of different situations. In the embodiment shown in FIGS. 10 through 12, the lift arm 114 is intended to lift an individual seated on a wheelchair 12 from a position on the ground to a position secured in the vehicle 110. The engagement of the lift arm 114 with the wheelchair 12 is by mating of the engagement device 64 with the coupling device 10, which is described in detail above. While the present invention is preferably intended for engagement with a wheelchair 12, it will be understood that the lift mechanism 52 can also engage a power wheelchair, a seating module, such as illustrated in FIG. 3 or a variety of other seating devices, as will be understood by one of skill in the art.

As shown in the application here illustrated, the lift arm 114 extends from the interior 120 of the vehicle 110 forwardly through the open front 122 to engage the wheelchair 12 or other seating device. In the fully extended position, the face plate portion 128 of the engagement device 64 mates with the coupling device 10 on the wheelchair 12. In order to effectuate engagement, the operator of the wheelchair can back the wheelchair 12 rearwardly until the coupling device 10 engages the engagement device 64 and a mating engagement is achieved. Once the wheelchair 12 is contacting the face plate portion 128, the operator can, through the use of the control handle 192, activate the actuator 116 causing the electric actuators 136 to retract, which causes the lift arm 114 to move rearwardly, thereby causing engaging of the coupling components and lifting the wheelchair 12 and an occupant positioned therein. Obviously, the same engagement and lifting procedure would apply to other seating devices, including a power wheelchair and a seating module, as well as to other storage or devices to be lifted.

As shown, the operator can stop the actuator 116 by releasing the appropriate button 194 on the control handle 192 to stop the movement of the wheelchair 12 at a variety of positions between the initial ground engaging position and the fully retracted position within the interior 120 (FIG. 11). For example, as shown, the operator can stop the actuator 116 to halt the movement of the lift arm 114 at an intermediary position generally designated by 114' such that the wheelchair is in the position designated by reference number 12'. This allows an operator to utilize an elevated position while seated in the wheelchair 12 for a variety of reasons. For instance, the operator can raise himself to a forward eye level position with another person for talking and/or observing outdoor events. Additionally, the operator can change the angle of inclination of the wheelchair 112 by actuating the sprocket actuator 184, as discussed above, in order to tilt the face plate portion 128 to recline the wheelchair 12 or seating module.

As the lift arm 114 raises the operator, the weight of the operator tensions the chains 176 that extend between the lift sprockets 162 and the rotating cam sprockets 170. As shown in FIG. 9, an idler 200 is used to hold each of the chains 176 within the confines of the bent arm configuration of the lift arm 114 to maintain orientation of the wheelchair 12 when raised back into the vehicle 10. As shown in FIGS. 11 and 12, the lift arm 114 moves the wheelchair 12 to a position at rest within the interior 120 of the vehicle 110 designated by reference number 12". In this position, the lift arm is in the position designated by reference number 114". The final position of the lift arm 114 in the fully retracted position in the mobility vehicle 110 with the coupling system 5 attached thereto, is shown in FIG. 10. Once in the vehicle 110, the coupling system 5 completes the securing of the wheelchair 12, by means of engaging latch 54. It is foreseen that other mechanical means, including telescoping boom arm, sliding lift rails and swing booms or any combination of such can be utilized in conjunction with the coupling system 5 to accomplish the lifting of the wheelchair 12 and its positioning within the vehicle 110 as well as to secure the wheelchair 12 in an operating position to drive the vehicle 110, as are described in more detail below.

Figure 13:
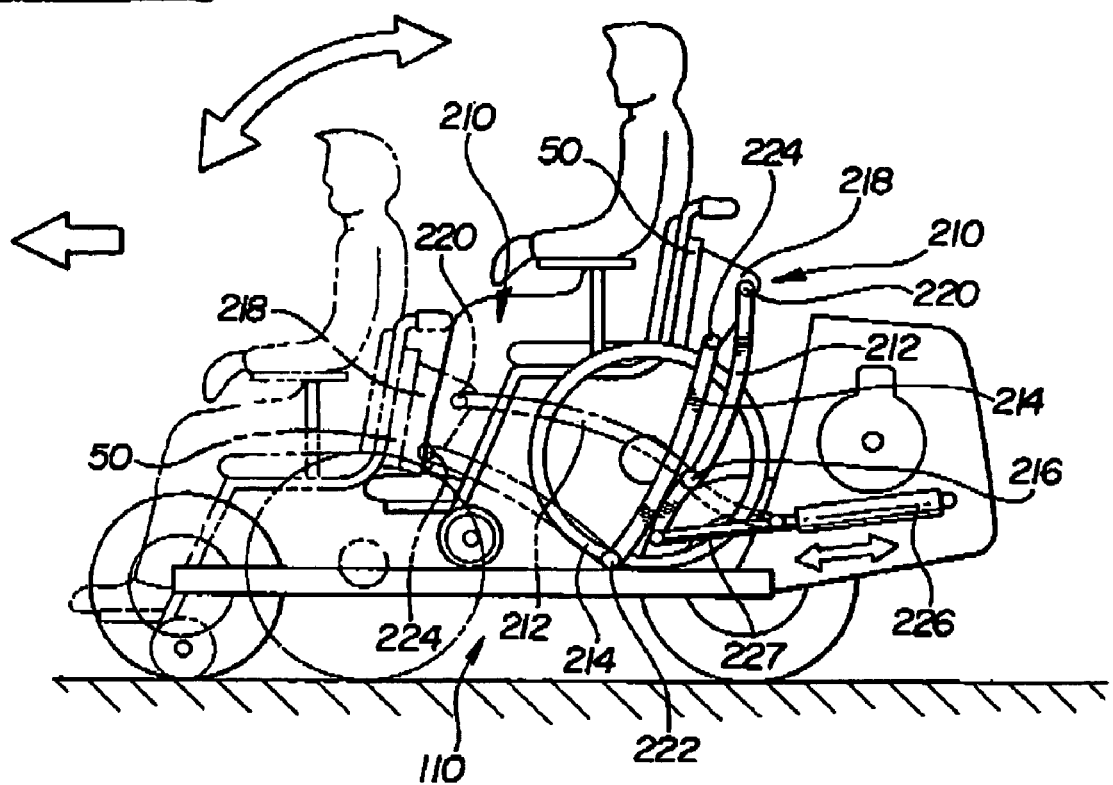
FIG. 13 is a schematic side view of another embodiment of a lift mechanism which would employ an engagement device of a coupling system for moving a wheelchair or seating device from a ground engaging position to a position with a mobility vehicle in accordance with a preferred embodiment of the present invention.
Figure 14:
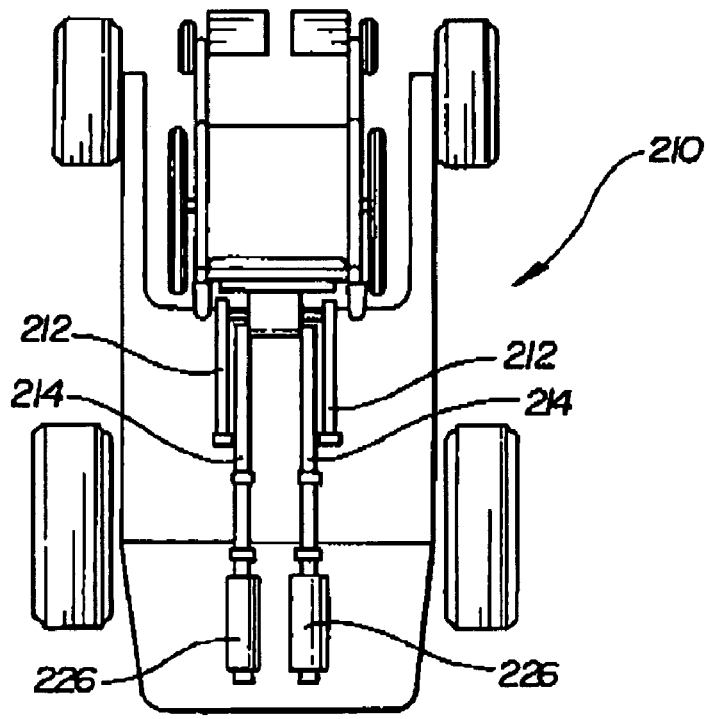
FIG. 14 is a schematic top view of another embodiment of a lift mechanism which would employ an engagement device of a coupling system for moving a wheelchair or seating device from a ground engaging position to a position within a mobility vehicle in accordance with a preferred embodiment of the present invention.

Referring now to FIGS. 13 and 14, which illustrate another embodiment of a lift mechanism 210 in accordance with the present invention. The lift mechanism 210 performs the same function as the lift mechanism 52. The lift mechanism 210 is preferably a four bar linkage system including a pair of upper bars 212 and a pair of lower bars 214. The pair of upper bars 212 are secured to the vehicle 110 at an inner end 216 and at an outer end 220 to a face plate 218. The pair of lower bars 214 are secured to the vehicle 110 at an inner end 222 and at an outer end 224 to the face plate 218. The face plate 218 has an engagement device 50 located thereon. The inner ends 216 of the upper bars 212 has an extended lever 227 which is in communication with an actuator 226. As discussed above, the actuator 226 effectuates raising and lowering of the lift mechanism 210 as well as the attached wheelchair or other seating device. A rack and pinion like mechanism may also be utilized, as will be understood by one of skill in the art.

Figure 16:
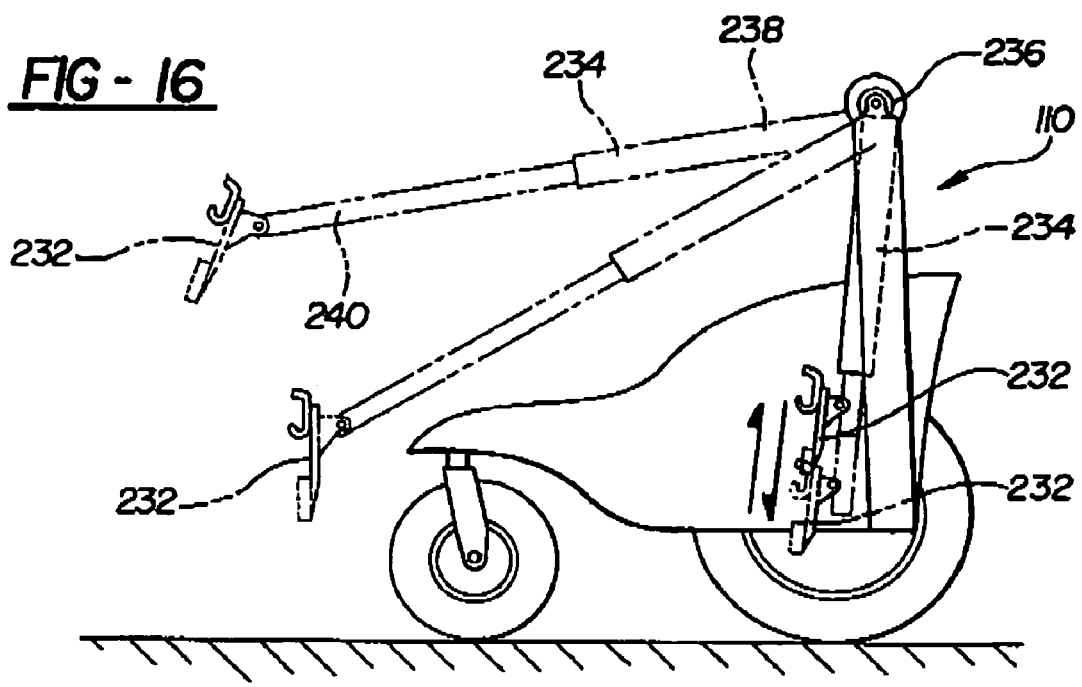
FIG. 16 is a schematic side view of a lift mechanism employing an engagement device of a coupling system for securing and lifting a wheelchair, power wheelchair or seating device from a ground engaging position to an elevated position in accordance with a preferred embodiment of the present invention.
Figure 15:
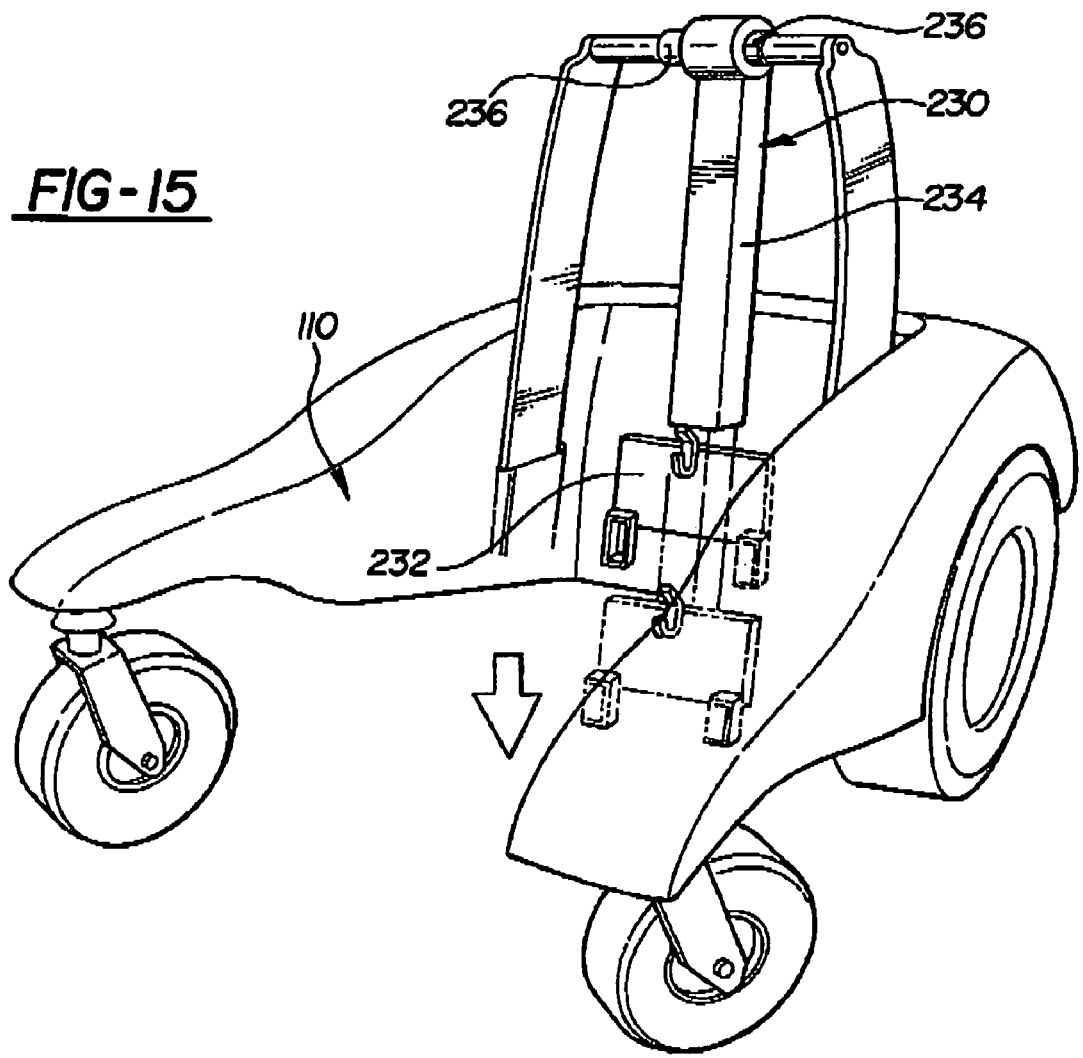
FIG. 15 is a schematic perspective view of a lift mechanism employing an engagement device of a coupling system for securing and lifting a wheelchair, power wheelchair or seating device from a ground engaging position to a position in a vehicle in accordance with a preferred embodiment of the present invention.

Referring now to FIGS. 15 and 16, which illustrates another embodiment of a lift mechanism 230 in accordance with the present invention. The lift mechanism 230 is preferably incorporated into an mobility vehicle 110, but as will be understood can be incorporated into a variety of other transportation modes. The lift mechanism 230 includes a face plate 232 upon which an engagement device 64 is preferably disposed. The engagement device 64 is preferably intended to mate with a coupling device 62 attached to a wheelchair 12 or other seating device. The face plate 232 is slideably or telescopically disposed on a lift arm 234, the actuation of which controls the lifting and covering of the face plate 232 and thus the attached seating device. The lift arm 234 is also in communication with a pair of rotary actuators 236 that are secured to the structure of the vehicle 110 and when actuated, provide further lifting, lowering and extended location of the face plate 232 and thus the attached seating device. In this embodiment, the wheelchair 12 or other device is backed into the open front 122 of the vehicle 110 and into engagement with the engagement device 64. The wheelchair 12 or other device can then be lifted to a driving position within the vehicle through the use of the wheelchair controls or other controls, as will be understood by one of skill in the art.

Rotary actuators 236 can further be utilized for positioning the wheelchair 12 or other seating device forwardly and elevated for requirements of the operator for reaching, transfer and visibility needs. The actuators 236, as will be understood, control the lifting of the lift arm 234. The lift arm 234 can be controlled to stop its motion anywhere between a ground engaging position and a fully elevated position. The face plate 232 is preferably rotatably secured to the lift arm 234, such that as the lift arm 234 is raised, the face plate 232 and thus the wheelchair 12 or other seating device tilt with respect to the lift arm 234 such that during lifting, the wheelchair or seating device bottom remains parallel to the ground. Moreover, the lift arm 234 also preferably utilizes its telescopically or slideably disposed movement. In other words, the lift arm 234 has an outer stationary portion 238 and an inner reciprocal portion 240. Upon actuation, the inner reciprocal portion 240 slides outwardly with respect to the outer stationary portion 238 to allow the wheelchair 12 or other seating device to be further extended from the vehicle 110.

Figure 17:
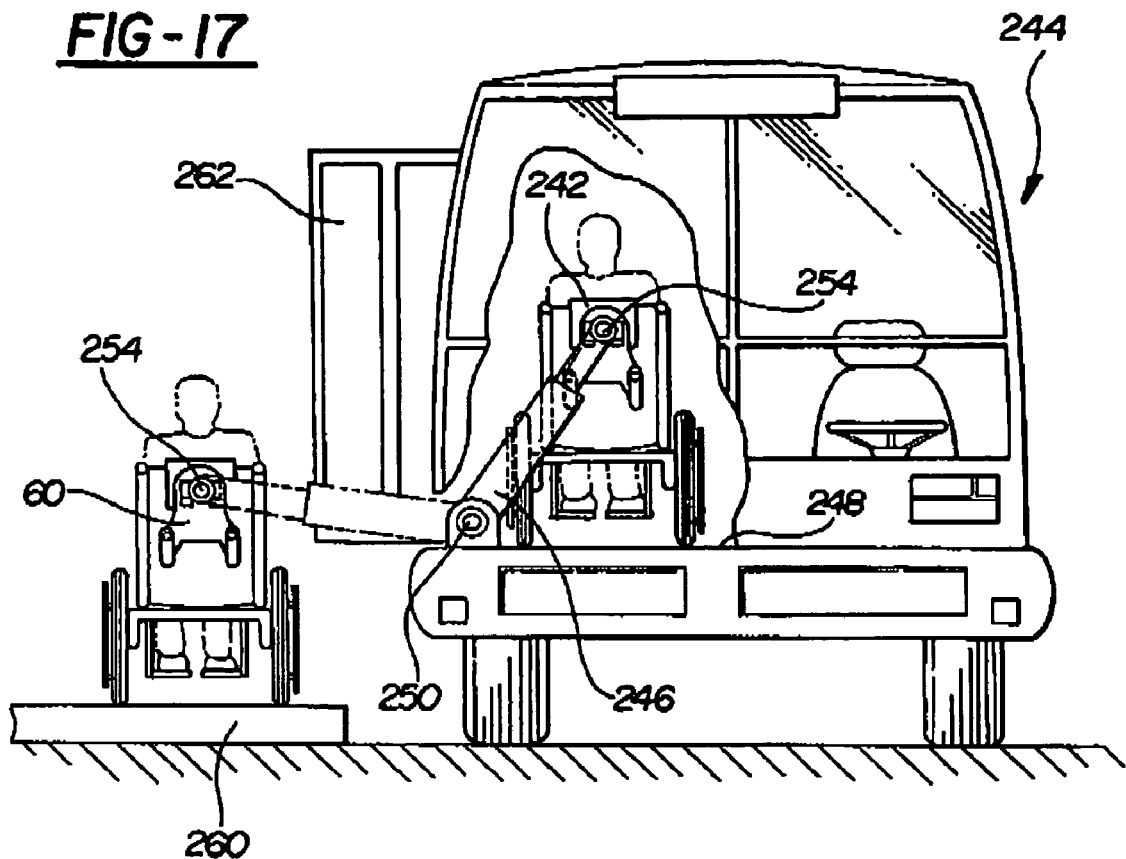
FIG. 17 is a schematic front view of another embodiment of a lift mechanism employing an engagement device of a coupling system for securing and lifting a seating device from a ground engaging position to a position in a bus for example, in accordance with a preferred embodiment of the present invention.
Figure 18:
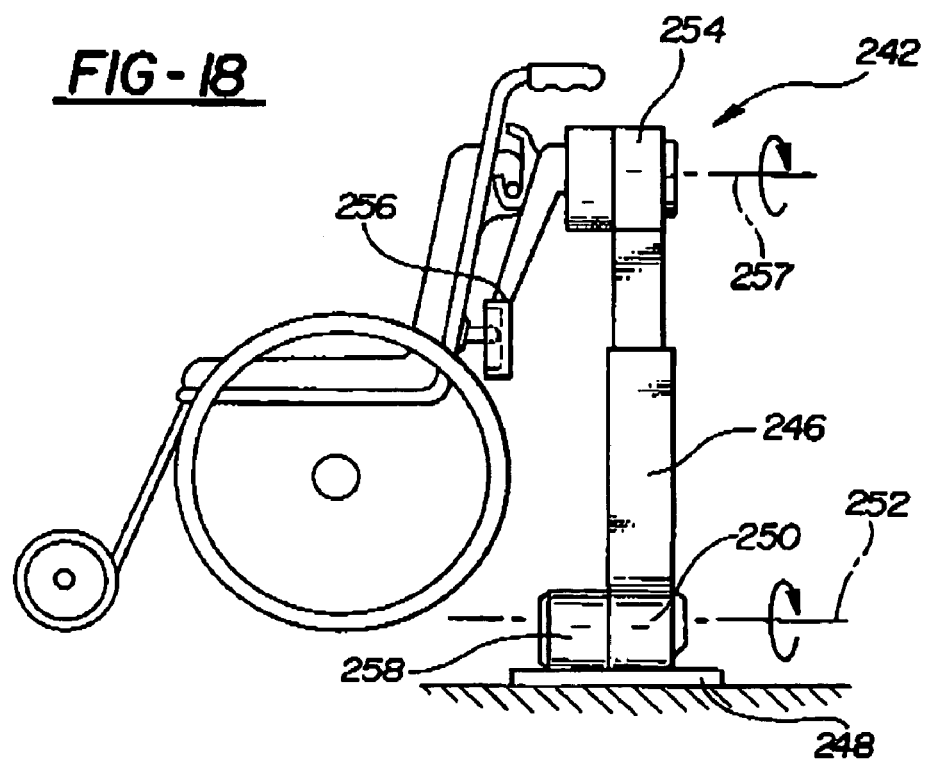
FIG. 18 is a schematic side view of the lift mechanism employing an engagement device of a coupling system for securing and lifting a seating device in accordance with a preferred embodiment of the present invention.

Referring now to FIGS. 17 and 18, which illustrate another embodiment of a lift mechanism 242. In this embodiment, the lift mechanism 242 is preferably for use in connection with public transportation, such as a bus 244, to raise an occupied wheelchair 12 or other seating device from a ground engaging position to a position secured within the bus 244. As shown, the lift mechanism 242 includes a lift arm 246, which is secured to the bus 244, such as to the bus floor 248, at an inner end 250. The lift arm 250 is pivotable about its inner end 250, such that it can rotate about an axis 252.

The lift arm 246 has an outer end 254 which has a face plate 256 secured thereto. The face plate 256 preferably has an attachment device 64 secured thereto which is intended to engage a coupling device 62, which is secured to the wheelchair 12 or other seating device. The face plate 256 is rotatably secured to the outer end 254 of the lift arm 246. Thus, as the lift arm 246 is lowered, the face plate 256 rotates about an axis 257, such that the engagement device 64 is aligned to mate with the coupling device 62. Moreover, the lift arm 246 may also have telescopic capabilities allowing the arm to extend outwardly as desired. The lift arm 246 is preferably driven by an electric rotary actuator device 258 which is in communication with an electric rotary actuator on the axis 257, such that the face plate 256 rotatably maintains a horizontal orientation of the wheelchair 12 or seating device, while being translated into or out of said vehicle.

As shown in FIG. 17, the lift mechanism 242 is operative to engage and secure an occupied wheelchair 12 that is on a curb or sidewalk 260 and lift them to a position within the bus 244. The occupied wheelchair 12 is then secured within the bus 244 by means of either remaining attached to the lift system, or by uncoupling and moving to another securing position in the vehicle. No modification of the wheelchair 12 is required to effectuate lifting. The reverse operation will result in lowering the wheelchair 12 from the bus 244 to a ground engaging position. It will be understood that while the preferred lift arm is a rotary arm, the lifting operation could be accomplished by a telescoping lift arm, a four bar linkage lift arm, or a slideable translation arm. Each of these alternative configurations will be understood by one of skill in the art.

As will also be understood, prior to the rotation of the lift arm 246, at least a side portion 262 of the bus 244 will swing open to allow a path for the lift arm 246 to travel and an opening through which the wheelchair 12 or other seating device can enter and exit the vehicle. The opening of the side portion 262 can be controlled by the electric actuator 258 or can alternatively be controlled independently.

Figure 19:
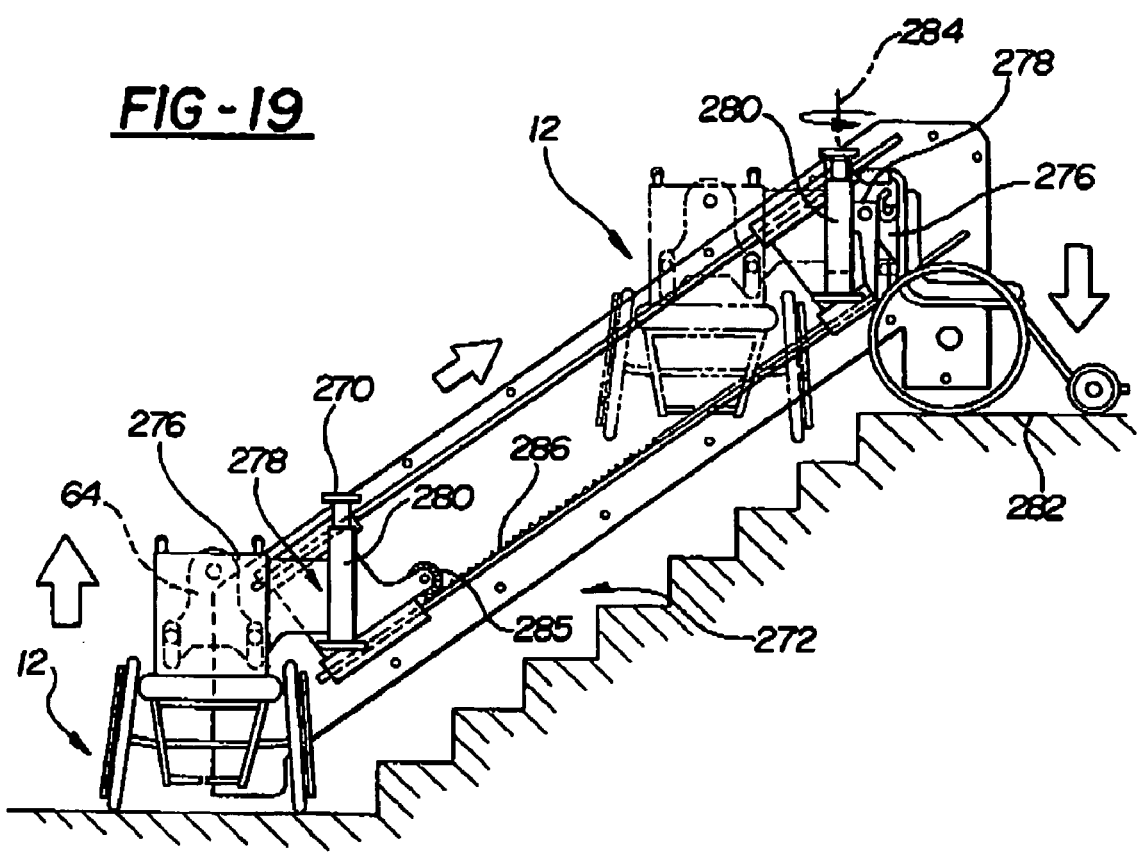
FIG. 19 is a schematic illustration of a lift mechanism employing an engagement device of a coupling system for securing and lifting a seating device for architectural purposes in accordance with a preferred embodiment of the present invention.

FIG. 19 illustrates another application for the preferred coupling system 5 in accordance with the present invention. Because the preferred coupling system 5 is universal in nature and preferably becomes standard in dimension on all wheelchairs and power wheelchairs, it can be utilized for architectural applications, such as to negotiate elevation changes in a building, which is typically a challenge for the physically handicapped or for those that require assistance. As shown in FIG. 19, the coupling system 5 is utilized with a lift mechanism 270 to negotiate a flight of stairs, generally indicated by reference number 272.

The lift mechanism 270 is mounted on a rail system 274, which is secured to a wall or other structure. The lift mechanism 270 includes a face plate 276 which has an engagement device 64 secured thereon. The engagement device 64 is intended to mate with a coupling device 10 to secure an attached wheelchair 12 or other seating device. The face plate 276 is secured to a lift arm 278, which is in slideable communication with and rides on the rail system 274. Once the engagement device 64 is mated with the coupling device 10, an actuator 280 causes the lift arm 278 to raise the wheelchair 12 to a height sufficient to engage the coupling system 5 and clear the stairs. The rail system 274 with motor drive 285 engaging tooth rack 286 then, based on the operator's manipulation of the lift mechanism's or of the wheelchair's controls in communication with the lift mechanism controls, moves the lift mechanism 270 and thus the wheelchair 12 up the rail system 274 to a landing 282 at the top of the stairs 272. It is understood that other mechanisms of translation on the rail system 274 are possible such as manual assist, chain, cable, screw drive and actuator systems.

Once at the landing 282, the lift arm 278 rotatably pivots about an axis 284, such that it is directionally pointed forward. This rotation 284 can happen automatically once the lift mechanism 270 reaches the landing 280 or other suitable actuation point. Alternatively, the rotation can occur based on operator control. Once rotated, the operator can decouple from the lift arm 278 by lowering the actuator 280 and move away from the engagement device 64.

Figure 20:
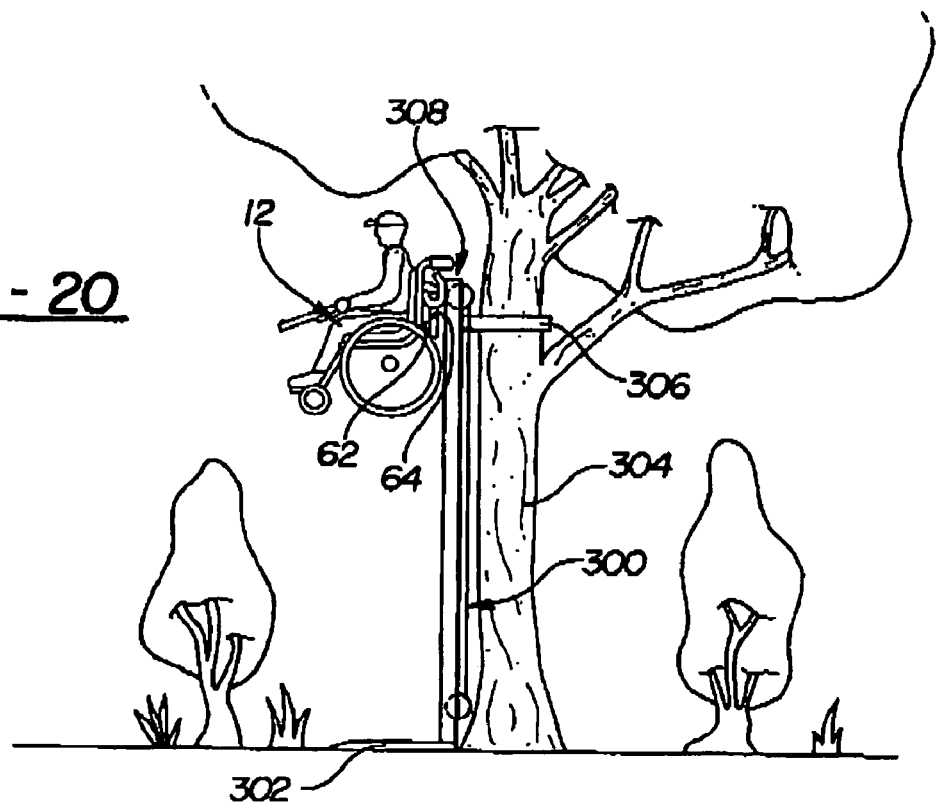
FIG. 20 is a schematic illustration of a lift mechanism employing an engagement device of a coupling system for securing and lifting a seating device for recreational and sport purposes in accordance with a preferred embodiment of the present invention.

FIG. 20 illustrates another application for the preferred coupling system 5 in accordance with the present invention. The coupling system 5 can also be utilized to raise and lower a wheelchair 12 or other seating device from a ground engaging position to an elevated position for recreational and sport purposes. For example, FIG. 20 illustrates the coupling system 5 as used with a tree stand 300, such as for hunting, which engages the ground at its bottom 302 and is secured to a tree 304 at another point by a securing mechanism 306. The tree stand 300 has an elevating mechanism 308 associated therewith. The elevating mechanism 308 has a slideable plate 310 with the engagement device 64 secured thereto. The engagement device 64 is intended to mate with a coupling device 62 secured to a wheelchair 12 or other seating device. Once an operator is secured safely in the wheelchair 12 or other seating device and the wheelchair 12 is coupled to the lift mechanism 308, the operator through the wheelchair controls or other controls can activate the lift mechanism through the elevating mechanism 308 to elevate themselves. The same applies for lowering. It is understood that the elevating mechanism 308 can utilize a variety of known methods such as a manual pulley or ratchet system, power screw system, cable and winch system, telescoping actuation, rack and pinion system as well as others. The coupling system 5 of the present invention thus has an almost unlimited number of uses.

Figure 21:
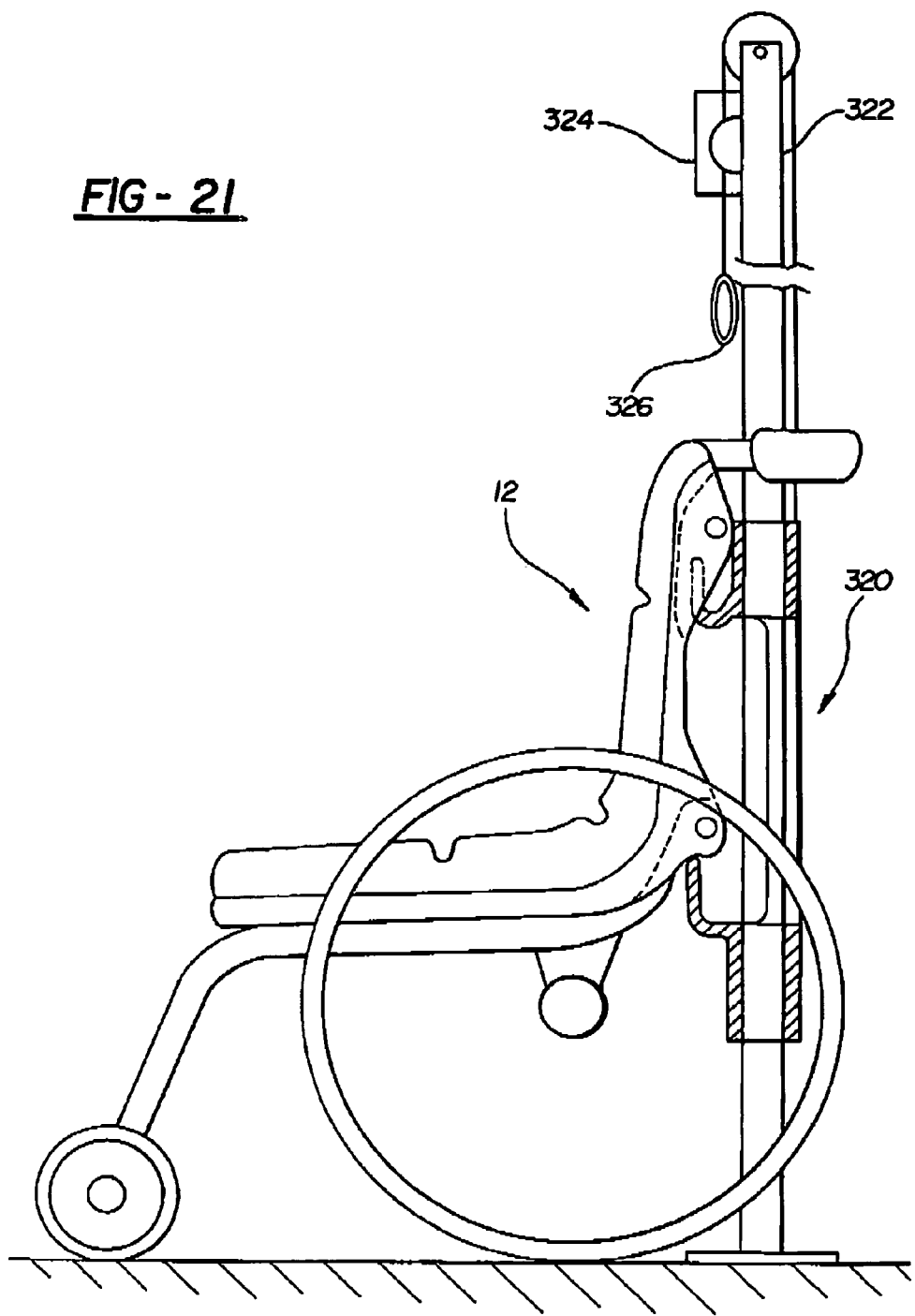
FIG. 21 is a schematic illustration of a location securing mechanism employing an engagement device of a coupling system for securing a wheelchair or power wheelchair in a transportation vehicle such as a bus, or restraining a wheelchair in an architectural setting such as might be required in a mental health hospital in accordance with a preferred embodiment of the present invention.

FIG. 21 illustrates a securing system 320 for use in connection with the preferred coupling system 5. As shown, the securing system 320 is preferably attached to a pole 322 or other secure structure. The pole 322 is preferably secured to or already existing on a public transportation system, such as a bus, an elevated train, a non-elevated train, a subway or other mode of transportation. In one embodiment, a simplified version of the engagement device 64 is secured to the pole 322, but can move slightly up and down. The wheelchair 12 has coupling device 62, such as shown in FIG. 3, secured thereto. The up movement of the securing system 320 would preferably engage the upper support bar 78 and the lower clamp bar 90 of coupling device 62. The pole 322 also has a latch security and release device 324 mounted thereon for effecting engagement of the system and release of engagement.

In operation, once an operator has backed the wheelchair 12 up to the pole 322 such that the coupling device 62 is aligned with the engagement device 64, the operator pulls on the latch cord 326. The latch cord 326 causes the engagement device 64 to move upward on the pole 322 and into engagement with the coupling device 62 to secure the wheelchair 12 thereto. Similarly, to unsecure the wheelchair 12, the operator pulls and releases the latch cord 326 and the engagement device 64 moves downward to unhitch the wheelchair 12 thereby allowing the wheelchair 12 to wheel away. It is understood that other latching methods are possible with utilization of universal dimensional standards of the support bar 78 and the clamp bar 90 of the coupling device 62. It is further understood that a typical car door latch system could be utilized in conjunction with only one of these bars for effective securing of wheelchair 12.

Advantages of the present system include the fact that the operator has the wheelchair 12 with him/her in the vehicle 110 or other device at all times and is seated therein without the need to transfer. Further, the wheelchair is also available for ready use upon deployment after reverse operation of the lift arm by lowering and unsecuring. Additionally, another advantage is that the seat is secure independent of the rigidity of the wheelchair wheels. Moreover, the system provides complete power entry and automatic latch securing by way of a simple mechanical system and that actuation of the system for exit automatically opens the securing latch to release the coupling system 5 and the lift mechanism for lowering. While not in the vehicle operating position, it is further foreseen as advantageous that the operator is capable of locating him/herself advantageously, with this mechanism, for effectively sitting forward outside the vehicle while still attached, raising operator viewing position or reach position.

A primary advantage of the coupling device 10 on the wheelchair frame is the secure latching of the wheelchair, power wheelchair, or seating module to resist movement, in the case of attaching in a vehicle. This attachment further is useful for lifting mechanisms, as in the case of lifting the wheelchair, power wheelchair, or seating module and occupant securely into the vehicle or in elevating the wheelchair, power wheelchair, or seating module, in a building environment. It is foreseen that broad acceptance of the advantages of this system will lead to a standardization of the device system for all wheelchairs and power wheelchairs for common use in future vehicle mode use and building elevation needs. For example, the present universal coupling system 5 may be utilized to lift wheelchairs or other seating devices into buses, boats, agricultural equipment, up stairs and anywhere else that elevation changes may be required, but are difficult for those needing assistance.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

The invention claimed is:

1. A system for coupling a seating device having both a frame portion and a plurality of wheels to a driven vehicle, said system comprising:

a coupling device in communication with said frame portion of said seating device; and a lift mechanism associated with said driven vehicle, said lift mechanism having an engagement device for mating with said coupling device through at least three points of contact so as to effectuate securing of said coupling device to said lift mechanism and thereby allow lifting of said seating device upwardly and rearwardly from the ground and into said driven vehicle even while said seating device is occupied, and said lift mechanism also having control means for actively changing the angle of inclination of said engagement device so as to effectuate tilting of said seating device as desired when lifted.

2. The system of claim 1, wherein the seating device is a wheelchair.

3. The system of claim 1, wherein the seating device is a power wheelchair.

4. The system of claim 1, wherein said coupling device is secured to a seat back structure of the seating device.

5. The system of claim 1, wherein said coupling device is secured to a seat bottom structure of the seating device.

6. The system of claim 1, wherein the driven vehicle is an automobile having said lift mechanism incorporated therein.

7. The system of claim 1, wherein the driven vehicle is a personal mobility vehicle having said lift mechanism incorporated therein.

8. The system of claim 1, wherein said coupling device includes a rearwardly extending portion for communication with said engagement device on said lift mechanism.

9. The system of claim 8, wherein said rearwardly extending portion includes at least one horizontal bar that communicates with at least one engaging structure on said engagement device.

10. The system of claim 9, wherein said at least one engaging structure acts as a securing device for said seating device.

11. The system of claim 9, wherein said at least one engaging structure is a hook-like structure.

12. The system of claim 1, wherein said coupling device includes a downwardly facing hook for communicating with at least one lift device on said engagement device.

13. The system of claim 12, wherein said coupling device further includes at least one rearwardly extending structure that is intended to fit into a corresponding recess formed on said engagement device to align said seating device with respect to said lift mechanism, said at least one extending structure providing positional stability to the attached seating device.

14. The system of claim 1, wherein said coupling device further includes an electrical connector for mating with an associated electrical receptor device on said engagement device of said lift mechanism so that electrical controls on said seating device are able to communicate with and control operation of said lift mechanism.

15. The system of claim 14, wherein said electrical controls also control the operation of the driven vehicle.

16. The system of claim 1,
wherein said coupling device has structure that helps locate said coupling device with respect to said engagement device to effectuate mating thereof; and
wherein said structure includes at least two features selected from the group consisting of an engagable hook, a receivable guide pin, and a capturable bar for thereby establishing said at least three points of contact.

* * * * *

UNITED STATES PATENT AND TRADEMARK OFFICE
CERTIFICATE OF CORRECTION

PATENT NO. : 7,296,960 B2  Page 1 of 1
APPLICATION NO. : 10/154077
DATED : November 20, 2007
INVENTOR(S) : Russell W. Strong It is certified that error appears in the above-identified patent and that said Letters Patent is hereby corrected as shown below:

Title Page: Paragraph 74, "Dickstein" should be --Dickinson--.

Signed and Sealed this

Third Day of June, 2008

JON W. DUDAS
*Director of the United States Patent and Trademark Office*